(12) United States Patent
Matsunaga et al.

(10) Patent No.: US 8,122,116 B2
(45) Date of Patent: Feb. 21, 2012

(54) STORAGE MANAGEMENT METHOD AND MANAGEMENT SERVER

(75) Inventors: Naoyuki Matsunaga, Yokohama (JP); Takato Kusama, Kawasaki (JP); Nobuo Beniyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 113 days.

(21) Appl. No.: 12/352,854

(22) Filed: Jan. 13, 2009

(65) Prior Publication Data

US 2010/0115049 A1    May 6, 2010

(30) Foreign Application Priority Data

Oct. 31, 2008  (JP) ................................. 2008-282267

(51) Int. Cl.
*G06F 15/173* (2006.01)
(52) U.S. Cl. ..................... 709/223; 370/254; 709/226
(58) Field of Classification Search .................. 718/104; 709/219, 223
See application file for complete search history.

(56) References Cited

U.S. PATENT DOCUMENTS

| | | | |
|---|---|---|---|
| 6,480,862 B1* | 11/2002 | Gall | 1/1 |
| 6,802,062 B1* | 10/2004 | Oyamada et al. | 718/1 |
| 7,587,436 B2 | 9/2009 | Agetsuma et al. | |
| 7,668,882 B2 | 2/2010 | Nakatani et al. | |
| 2005/0267929 A1 | 12/2005 | Kitamura et al. | |
| 2006/0129513 A1 | 6/2006 | Nakatani et al. | |
| 2007/0220204 A1* | 9/2007 | Nakajima et al. | 711/114 |
| 2008/0270564 A1 | 10/2008 | Rangegowda et al. | |
| 2008/0295096 A1* | 11/2008 | Beaty et al. | 718/1 |

FOREIGN PATENT DOCUMENTS

| | | |
|---|---|---|
| JP | 2006-164169 | 6/2006 |
| JP | A-2006-228188 | 8/2006 |
| JP | 2007-94473 | 4/2007 |
| JP | 2007-280099 | 10/2007 |
| JP | 2009116859 A * | 5/2009 |
| JP | 2009146161 A * | 7/2009 |
| JP | 2010108260 A * | 5/2010 |
| JP | A-2010-527056 | 8/2010 |

OTHER PUBLICATIONS

Office Action in JP 2008-282267, mailed Dec. 7, 2010 (2 pgs, in Japanese), Brief Translation of Official Action (3 pages, in English).
Office Action in JP 2008-282267, mailed Aug. 31, 2010 (3 pgs.) and brief English translation.

* cited by examiner

*Primary Examiner* — Jeffrey R Swearingen
(74) *Attorney, Agent, or Firm* — Antonelli, Terry, Stout & Kraus, LLP.

(57) ABSTRACT

A method for moving a virtual machine is provided which considers an input/output between array groups and virtual machines after being moved. The computer system includes a physical server executing the virtual machines, a storage device having array groups, and a management server that manages a link between the virtual machines and the array groups. The computer system is characterized in that an estimated I/O volume of the virtual machine after being moved is calculated and that, if the estimated I/O volume exceeds the maximum I/O volume of the array group connected to the moved virtual machine, a search is made to find an array group whose maximum I/O volume is smaller than the estimated I/O volume.

13 Claims, 20 Drawing Sheets

FIG.2

200 VIRTUAL MACHINE PERFORMANCE INFORMATION TABLE

| 201 | 202 | 203 | 204 | 205 | 206 | 207 | 208 | 209 | 210 | 211 | 212 | 213 | 214 |
|---|---|---|---|---|---|---|---|---|---|---|---|---|---|
| VM NAME | AP NAME | CPU UTILIZATION (%) | MEMORY UTILIZATION (%) | OPERATION RATE (%) | Rand Read IOPS (OPERATIONS/sec) | Rand Write IOPS (OPERATIONS/sec) | Seq Read IOPS (OPERATIONS/sec) | Seq Write IOPS (OPERATIONS/sec) | Rand Read I/O DATA TRANSFER VOLUME (Mbps) | Seq Read I/O DATA TRANSFER VOLUME (Mbps) | Rand Write I/O DATA TRANSFER VOLUME (Mbps) | Seq Write I/O DATA TRANSFER VOLUME (Mbps) | DATA COLLECTION TIME |
| VM 004a | AP 005a | 80 | 70 | 60 | 25 | 15 | 30 | 20 | 14 | 16 | 10 | 12 | 19:00 |
| VM 004b | AP 005b | 90 | 40 | 80 | 15 | 10 | 25 | 20 | 16 | 18 | 12 | 14 | 19:00 |
| VM 004c | AP 005c | 40 | 40 | 20 | 20 | 10 | 25 | 15 | 10 | 12 | 9 | 10 | 19:00 |

FIG.3

300  VIRTUAL MACHINE SPECIFICATION INFORMATION TABLE

| VM NAME | CPU ALLOCATION (GHz) | MEMORY ALLOCATION (GB) |
|---|---|---|
| VM 004a | 2.8 | 2.5 |
| VM 004b | 2.2 | 1.5 |
| VM 004c | 1.0 | 1.0 |

FIG.4

400 PHYSICAL SERVER PERFORMANCE INFORMATION TABLE

| 401 PHYSICAL SERVER NAME | 402 CPU UTILIZATION (%) | 403 MEMORY UTILIZATION (%) | 404 OPERATION RATE (%) | 405 Rand Read IOPS (OPERATIONS/sec) | 406 Rand Write IOPS (OPERATIONS/sec) | 407 Seq Read IOPS (OPERATIONS/sec) | 408 Seq Write IOPS (OPERATIONS/sec) | 409 Rand Read I/O DATA TRANSFER VOLUME (Mbps) | 410 Seq Read I/O DATA TRANSFER VOLUME (Mbps) | 411 Rand Write I/O DATA TRANSFER VOLUME (Mbps) | 412 Seq Write I/O DATA TRANSFER VOLUME (Mbps) | 413 DATA COLLECTION TIME |
|---|---|---|---|---|---|---|---|---|---|---|---|---|
| Server 001a | 84 | 59 | 90 | 40 | 25 | 55 | 40 | 30 | 34 | 22 | 26 | 19:00 |
| Server 001b | 10 | 13 | 20 | 40 | 20 | 50 | 30 | 10 | 12 | 9 | 10 | 19:00 |

FIG.5

500  PHYSICAL SERVER SPECIFICATION INFORMATION TABLE

| PHYSICAL SERVER NAME (501) | CPU CAPACITY (GHz) (502) | MEMORY CAPACITY (GB) (503) | MAXIMUM I/O DATA TRANSFER VOLUME (Mbps) (504) |
|---|---|---|---|
| Server 001a | 5.0 | 4.0 | 120 |
| Server 001b | 4.0 | 3.0 | 100 |

FIG.6

600  LDEV PERFORMANCE INFORMATION TABLE

| LDEV NAME (601) | OPERATION RATE (%) (602) | DATA COLLECTION TIME (603) |
|---|---|---|
| LDEV 025a | 60 | 19:00 |
| LDEV 025b | 80 | 19:00 |
| LDEV 025c | 20 | 19:00 |
| LDEV 025d | 0 | 19:00 |

FIG.7

700  LDEV SPECIFICATION INFORMATION TABLE

| LDEV NAME (701) | VOLUME (GB) (702) | AG NAME (703) |
|---|---|---|
| LDEV 025a | 200G | AG 026a |
| LDEV 025b | 250G | AG 026a |
| LDEV 025c | 200G | AG 026b |
| LDEV 025d | 250G | AG 026b |

FIG.8

800 ARRAY GROUP PERFORMANCE INFORMATION TABLE

| 801 AG NAME | 802 OPERATION RATE (%) | 803 Rand Read IOPS (OPERATIONS/sec) | 804 Rand Write IOPS (OPERATIONS/sec) | 805 Seq Read IOPS (OPERATIONS/sec) | 806 Seq Write IOPS (OPERATIONS/sec) | 807 Rand Read I/O DATA TRANSFER VOLUME (Mbps) | 808 Seq Read I/O DATA TRANSFER VOLUME (Mbps) | 809 Rand Write I/O DATA TRANSFER VOLUME (Mbps) | 810 Seq Write I/O DATA TRANSFER VOLUME (Mbps) | 811 DATA COLLECTION TIME | 812 USED VOLUME CAPACITY (GB) |
|---|---|---|---|---|---|---|---|---|---|---|---|
| AG 026a | 90 | 40 | 40 | 25 | 40 | 30 | 34 | 22 | 26 | 19:00 | 300 |
| AG 026b | 20 | 20 | 10 | 25 | 15 | 10 | 12 | 9 | 10 | 19:00 | 200 |

FIG.9

900 ARRAY GROUP SPECIFICATION INFORMATION TABLE

| 901 AG NAME | 902 VOLUME CAPACITY (GB) | 903 Disk Type | 904 Tier | 905 RAID Level | 906 Storage Type | 907 MAXIMUM Rand Read IOPS (OPERATIONS/sec) | 908 MAXIMUM Rand Write IOPS (OPERATIONS/sec) | 909 MAXIMUM Seq Read IOPS (OPERATIONS/sec) | 910 MAXIMUM Seq Write IOPS (OPERATIONS/sec) | 911 MAXIMUM Rand Read I/O DATA TRANSFER VOLUME (Mbps) | 912 MAXIMUM Seq Read I/O DATA TRANSFER VOLUME (Mbps) | 913 MAXIMUM Rand Write I/O DATA TRANSFER VOLUME (Mbps) | 914 MAXIMUM Seq Write I/O DATA TRANSFER VOLUME (Mbps) |
|---|---|---|---|---|---|---|---|---|---|---|---|---|---|
| AG 026a | 500 | FC | 2 | 10 | RAID 600 | 50 | 30 | 60 | 50 | 35 | 40 | 25 | 30 |
| AG 026b | 600 | FC | 2 | 15 | RAID 600 | 55 | 35 | 65 | 55 | 40 | 45 | 30 | 35 |

FIG.10

1000 PATH INFORMATION TABLE

| PHYSICAL SERVER NAME (1001) | DEVICE FILE NAME (1002) | VM NAME (1003) | LDEV NAME (1004) |
|---|---|---|---|
| Server 001a | Device 1 | VM 004a | LDEV 025a |
| Server 001a | Device 2 | VM 004b | LDEV 025b |
| Server 001b | Device 3 | VM 004c | LDEV 025c |

FIG.11

1100 MAPPING MODEL TABLE

| 1101 AP NAME | 1102 PHYSICAL SERVER CPU CAPACITY (GHz) | 1103 PHYSICAL SERVER MEMORY CAPACITY (GB) | 1104 PHYSICAL SERVER IDLE CPU CAPACITY (%) | 1105 PHYSICAL SERVER IDLE MEMORY CAPACITY (%) | 1106 VIRTUAL MACHINE CPU CONSUMPTION (GHz) | 1107 VIRTUAL MACHINE MEMORY CONSUMPTION (GB) | 1108 ESTIMATED Rand Read IOPS (OPERATIONS/sec) | 1109 ESTIMATED Rand Write IOPS (OPERATIONS/sec) | 1110 ESTIMATED Seq Read IOPS (OPERATIONS/sec) | 1111 ESTIMATED Seq Write IOPS (OPERATIONS/sec) | 1112 ESTIMATED Rand Read I/O DATA TRANSFER VOLUME (Mbps) | 1113 ESTIMATED Seq Read I/O DATA TRANSFER VOLUME (Mbps) | 1114 ESTIMATED Rand Write I/O DATA TRANSFER VOLUME (Mbps) | 1115 ESTIMATED Seq Write I/O DATA TRANSFER VOLUME (Mbps) |
|---|---|---|---|---|---|---|---|---|---|---|---|---|---|---|
| AP 005b | 4.0 | 3.0 | 90 | 87 | 1.98 | 0.6 | 20 | 15 | 30 | 25 | 20 | 22 | 16 | 18 |
| AP 005c | 2.0 | 4.0 | 80 | 75 | 1.98 | 0.7 | 30 | 20 | 20 | 30 | 15 | 17 | 23 | 21 |
| ... | ... | ... | ... | ... | ... | ... | ... | ... | ... | ... | ... | ... | ... | ... |

FIG.12

1200 PROCESSING VOLUME MODEL TABLE FOR EACH APPLICATION

| 1201 | 1202 | 1203 | 1204 | 1205 | 1206 | 1207 | 1208 | 1209 | 1210 | 1211 | 1212 |
|---|---|---|---|---|---|---|---|---|---|---|---|
| AP NAME | VIRTUAL MACHINE CPU CONSUMPTION (GHz) | VIRTUAL MACHINE MEMORY CONSUMPTION (GB) | VIRTUAL MACHINE I/O DATA TRANSFER VOLUME (Mbps) | ESTIMATED Rand Read IOPS (OPERATIONS/sec) | ESTIMATED Rand Write IOPS (OPERATIONS/sec) | ESTIMATED Seq Read IOPS (OPERATIONS/sec) | ESTIMATED Seq Write IOPS (OPERATIONS/sec) | ESTIMATED Rand Read I/O DATA TRANSFER VOLUME (Mbps) | ESTIMATED Seq Read I/O DATA TRANSFER VOLUME (Mbps) | ESTIMATED Rand Write I/O DATA TRANSFER VOLUME (Mbps) | ESTIMATED Seq Write I/O DATA TRANSFER VOLUME (Mbps) |
| AP 005a | 2.2 | 2.0 | 52 | 20 | 15 | 30 | 25 | 20 | 22 | 16 | 18 |
| AP 005b | 1.8 | 1.6 | 45 | 18 | 16 | 22 | 20 | 18 | 20 | 14 | 16 |
| ... | ... | ... | ... | ... | ... | ... | ... | ... | ... | ... | ... |

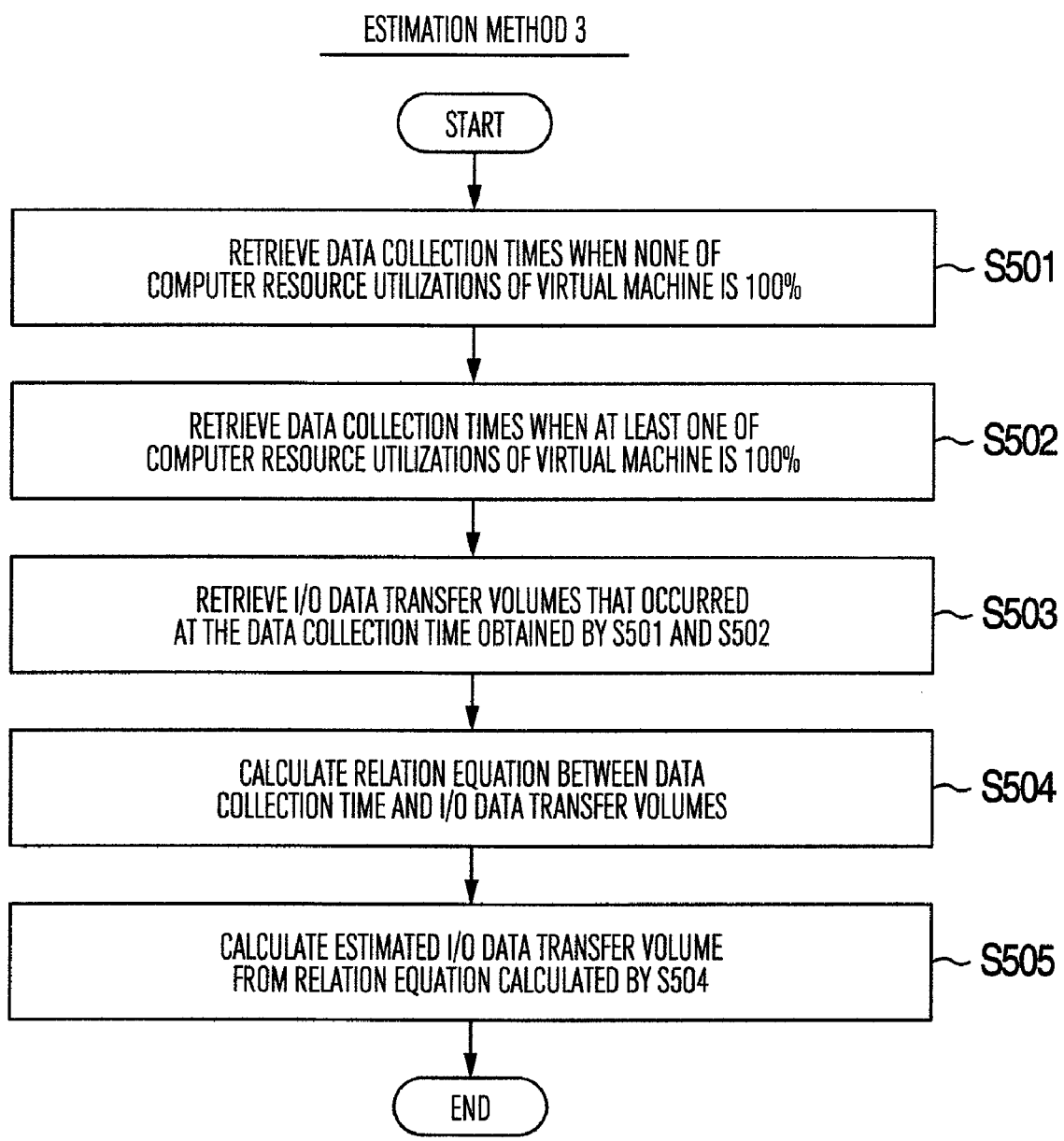

FIG.20

2000 MOVING VIRTUAL MACHINE SELECTION SCREEN

2001 DESTINATION PHYSICAL SERVER SELECTION FIELD

■ PHYSICAL SERVER SELECTION    2011 DESTINATION PHYSICAL SERVER SELECTION LIST   Server A ▼

2002 VIRTUAL MACHINE SELECTION FIELD

■ VIRTUAL MACHINE SELECTION    2021 VIRTUAL MACHINE SELECTION LIST   VM A ▼    2023 EXECUTE BUTTON   EXECUTE

2022 VIRTUAL MACHINE LIST

| VIRTUAL MACHINE NAME | CPU UTILIZATION | MEMORY UTILIZATION | DISK UTILIZATION |
|---|---|---|---|
| VM A | 80% | 90% | 50 GB |
| VM B | 40% | 30% | 40 GB |
| VM C | 50% | 60% | 10 GB |

ND MANAGEMENT SERVER

STORAGE MANAGEMENT METHOD AND MANAGEMENT SERVER

INCORPORATION BY REFERENCE

The present application claims priority from Japanese application JP2008-282267 filed on Oct. 31, 2008, the content of which is hereby incorporated by reference into this application.

BACKGROUND OF THE INVENTION

The present invention relates to a storage management method and a management server technology.

With information technologies spreading in a variety of business fields, the number of physical servers and the volume of data corporations hold have been continuing to rise. Under this circumstance a spotlight is being focused on a server virtualization technology to collectively manage an increasing number of physical servers to reduce their number and on a collective management of storage based on the SAN (Storage Area Network). Behind this trend there is a growing number of corporations intent on solving such problems as an increase in power consumption and exhaust heat volume due to increased densities of physical server groups and storage device groups and a scarcity of available floor space because of an increasing number of physical servers and storage devices.

The server virtualization is a technology that divides one physical server into a plurality of virtual machines (these virtually divided servers are hereinafter called virtual machines) and allocates computer resources such as CPU (Central Processing Unit) and memory of the physical server to individual virtual machines so that they can execute an OS (Operating System) and applications. One such server virtualization technology example is a technology that relocates the virtual machines among different physical servers (see U.S. Pat. No. 6,802,062).

According to the technology disclosed in this patent document, when the computer resources of a physical server allotted to virtual machines run out, it is attempted to search a new physical server able to allocate more computer resources and, if it is found, relocates the virtual machines to this server and allocates them to the server. This server virtualization allows the performance problems to be solved by utilizing the computer resources currently not in use, without having to purchase new physical servers, which in turn leads to a reduction in the total number of physical servers the corporation owns.

Next, a collective management of storage based on SAN will be explained. In an environment with no collective storage management in operation, a dedicated storage device needs to be provided to each server. When each server is provided with a dedicated storage device, unused disks present in the individual storage devices cannot be put to effective use, resulting in the disk volume owned by the company becoming huge. The SAN-based collective management of storage lets a single storage device be shared among a plurality of servers by connecting the servers to the storage device via networks. This enables the unused disks to be shared by a plurality of servers, reducing the number of storage devices and the disk volume owned by the company.

As described above, by combining the server virtualization and the collective storage management based on SAN, the number of physical servers and storage devices that a corporation maintains can be reduced.

SUMMARY OF THE INVENTION

A conventional server virtualization technology, when a performance problem occurs with a virtual machine, solves the problem without newly purchasing additional computer resources by moving the troubled virtual machine to another physical server. On the other hand, once the performance problem on the virtual machine is resolved, an I/O (Input/Output) volume to the storage device may increase. More specifically, when the virtual machine is moved from a physical server short of computer resources to a physical server with sufficient computer resources, the virtual machine that has been moved is now able to utilize more computer resources. Then, the I/O volume in the moved virtual machine is likely to increase. As a result, an I/O burden on the storage device also increases to more than a maximum I/O process capacity of the storage device, giving rise to a possibility of reducing an I/O performance of other application using that storage device. Since the conventional technology does not check in advance for a possible I/O performance reduction that can occur on the storage device side as a result of the relocation of the virtual machine, the solving of a performance problem for a certain application by relocating a virtual machine can induce a new performance problem with another application.

In the following, the reason that the I/O volume to the storage device increases if the conventional technology is employed will be detailed.

Allocating many computer resources to a virtual machine that has been relocated may increase the volume of processing executed by an application running on the virtual machine. As the volume of processing performed by the application increases, the I/O burden on the storage device used by the application may also increase. Further, an increase in the I/O burden on this storage device can cause the I/O burden on the storage device to exceed the maximum I/O process capacity, which in turn may degrade the I/O performance of other applications sharing the storage device in question and cause a performance problem. As described above, since the conventional technology allocates additional virtual resources to a virtual machine, other applications that share the storage device with the virtual machine may have a degraded I/O performance.

In light of the above problem, it is an object of the present invention to move a virtual machine by considering an input/output (I/O) of the moved virtual machine to and from an array group.

To solve the above problem, this invention is characterized by an operation that involves estimating an expected input/output data volume of the moved virtual machine and, if the estimated input/output data volume is found to be greater than a maximum input/output data capacity of a storage device accessible to the moved virtual machine, searching for a storage device whose estimated input/output data capacity is smaller than the allowable input/output data volume.

This invention enables the moving of a virtual machine considering the input/output (I/O) of the moved virtual machine to and from an array group.

Other objects, features and advantages of the invention will become apparent from the following description of the embodiments of the invention taken in conjunction with the accompanying drawings.

BRIEF DESCRIPTION OF THE DRAWINGS

FIG. 2 is an example of a virtual machine performance information table according to this embodiment.

FIG. 3 is an example of a virtual machine specification information table according to this embodiment.

FIG. 4 is an example of a physical server performance information table according to this embodiment.

FIG. 5 is an example of a physical server specification information table according to this embodiment.

FIG. 6 is an example of an LDEV performance information table according to this embodiment.

FIG. 7 is an example of an LDEV specification information table according to this embodiment.

FIG. 8 is an example of an array group performance information table according to this embodiment.

FIG. 9 is an example of an array group specification information table according to this embodiment.

FIG. 10 is an example of a path information table according to this embodiment.

FIG. 11 is an example of a mapping model table according to this embodiment.

FIG. 12 is an example of a processing volume model table for each application according to this embodiment.

FIG. 18 is a flow chart showing a sequence of steps in an "estimation method 3" to estimate an I/O data transfer volume according to this embodiment

FIG. 20 shows a screen in which to select a virtual machine to be moved according to this embodiment.

DESCRIPTION OF THE EMBODIMENT

Next, a best mode of implementing this invention (referred to as an "embodiment") will be described in detail by referring to the accompanying drawings as need arises.

In the storage management system described in the following embodiment, functions and details not essential to the present invention are omitted and thus the storage management system of this embodiment is simpler than a general one. This however in no way limits the range of application of this invention.

<System Configuration>

Figure 1:
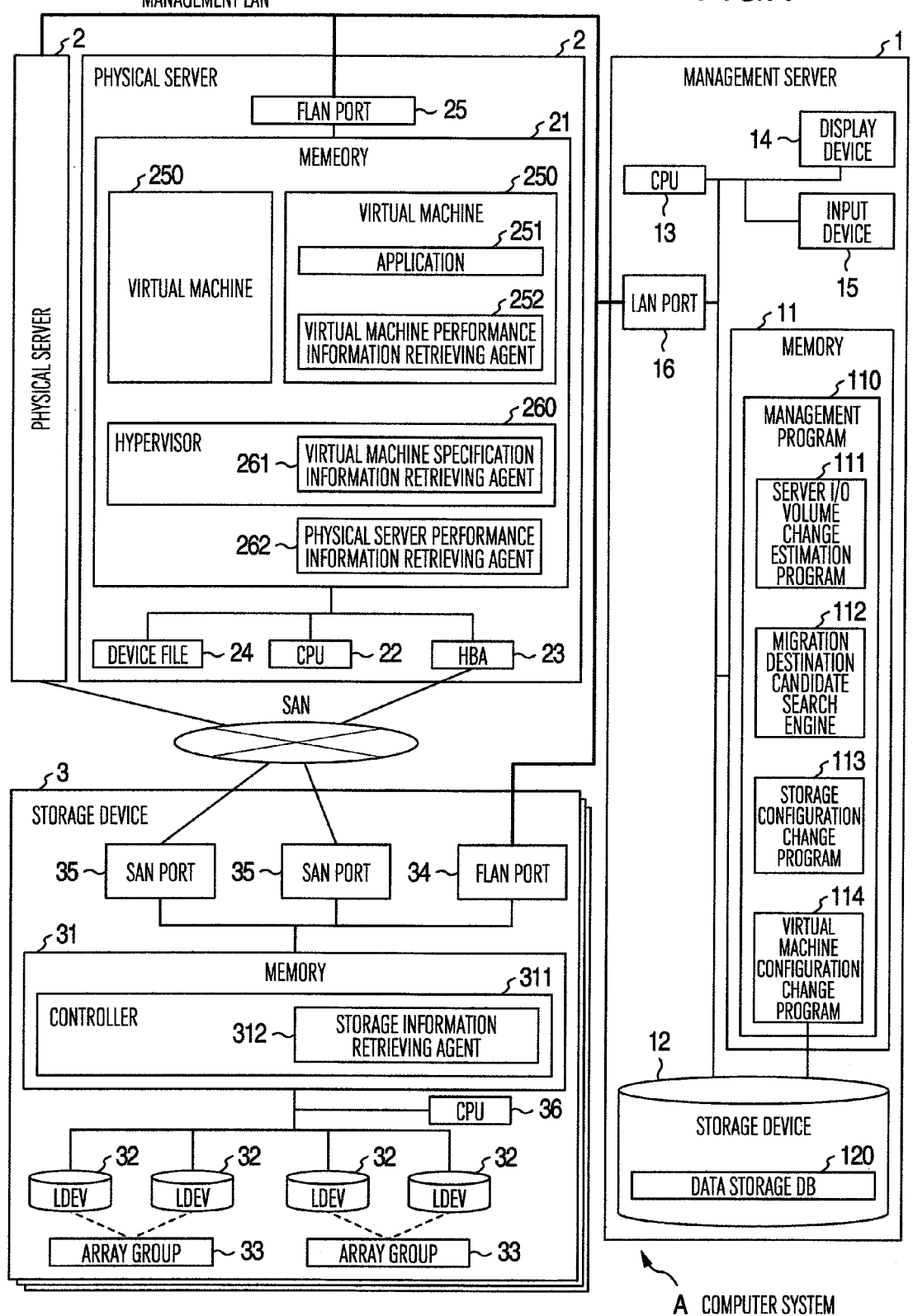
FIG. 1 is a block diagram showing an example configuration of a computer system according to this embodiment.

FIG. 1 shows an example configuration of a computer system according to this embodiment.

The computer system A has a plurality of storage devices 3, a plurality of physical servers 2 and a management server 1. The individual storage devices 3 and physical servers 2 are interconnected via SAN 4. The physical servers 2, the storage devices 3 and the management server 1 are interconnected via a management LAN (Local Area Network) 5. The connection between the physical servers 2 and SAN 4 is established via HBA (Host Bus Adapter) 23, and the connection between the storage devices 3 and SAN 4 is established via a SAN port 35. These devices 1-3 are connected to the management LAN 5 via LAN ports 16, 25, 34.

(Physical Server)

Each of the physical servers 2 has a CPU 22, a memory 21, a device file 24, an HBA 23 and a LAN port 25. Each physical server 2 is realized by loading a physical server performance information retrieving agent 262, a hypervisor program (hereinafter referred to as a hypervisor 260) and a plurality of virtual machines 250 into the memory 21, all stored in the physical server, and by the CPU 22 executing the program. The device file 24 will be described later.

The hypervisor 260 is a program with a function to control the amount of memory 21 available to the individual virtual machines 250, the capacity of CPU 22 available to each virtual machine, and the amount of I/O to and from the device file 24. The hypervisor 260 also has a function to move the virtual machines 250 to other physical servers 2. A virtual machine specification information retrieving agent 261 executed within the hypervisor 260 is a program having a function to retrieve from the hypervisor 260 specification information, such as CPU allocations and memory allocations assigned to the individual virtual machines 250.

The virtual machines 250 are a program that is implemented by allocating the CPU 22, memory 21 and device file 24 to each application 251 running on the virtual machines 250. The application 251 being executed within the virtual machine 250 is a program having a function to execute jobs using computer resources such as CPU 22 and memory 21 allocated to the virtual machine 250. A virtual machine performance information retrieving agent 252 being executed within the virtual machine 250 is a program having a function to retrieve from the virtual machine 250 its own performance information.

The physical server performance information retrieving agent 262 is a program to retrieve from the physical server 2 its own performance information.

(Management Server)

The management server 1 has a CPU 13, a memory 11, a LAN port 16, a display device 14, an input device 15 and a storage device 12 (storage unit).

In the memory 11 is loaded a management program 110 that is executed by the CPU 13 to implement its function. In the management program 110 there are being executed such programs as a server I/O volume change estimation program 111 (estimation value calculation unit), a migration destination candidate search engine 112 (search unit), a storage configuration change program 113 (storage configuration change unit), and a virtual machine configuration change program 114 (virtual machine configuration change unit). These programs executed within the management program 110 will be detailed later.

The storage device 12 stores a database 120 holding tables that will be described by referring to FIG. 2 to FIG. 13.

(Storage Device)

The storage device 3 has a CPU 36, a memory 31, at least one SAN port 35 and one LAN port 34, at least one LDEV 32 (Logic Device), and at least one array group 33 (storages).

In the memory 31 is loaded a control program (hereinafter referred to as a controller 311) that is developed there and executed by the CPU 36 to implement its function.

Using a plurality of disks, the controller 311 builds array groups 33 with a particular RAID (Redundant Array of Inexpensive Disks) level. The controller 311 also creates a virtual volume having a capacity specified by the array groups 33. In this embodiment this virtual volume is called an LDEV 32. Further, the controller 311 also has a function to move data in the LDEV 32 to another array group 33. The created LDEV 32 is made public in the physical server 2 via the SAN port 35 and the HBA 23. Then, the physical server 2 can recognize the open LDEV 32 as the device file 24.

In the controller 311 a storage information retrieving agent 312 is executed. The storage information retrieving agent 312 is a program to retrieve from the controller 311 performance information on the LDEVs 32 in the storage device 3 and the array groups 33 making up the LDEVs 32. The controller 311 has a function to retrieve performance information on the LDEVs 32 and the array groups 33 and also a function to, in combination with the storage information retrieving agent 312, move data in an LDEV 32 to another LDEV 32.

The storages making up the array groups are not limited to hard disks (HDs) and may include flush memories.

<Tables>

Next, referring to FIG. 2 to FIG. 12 along with FIG. 1, tables according to the embodiment will be explained.

FIG. 2 shows an example of a virtual machine performance information table according to this embodiment.

A virtual machine performance information table 200 stores performance information of each virtual machine 250 and has VM (Virtual Machine) name (column 201), AP (Application) name (column 202), CPU utilization (column 203), memory utilization (column 204), operation rate (column 205), RandRead IOPS (Random Read I/O Per Second) (column 206), RandWrite IOPS (Random Write I/O Per Second) (column 207), SeqRead IOPS (Sequential Read I/O Per Second) (column 208), SeqWrite IOPS (Sequential Write I/O Per Second) (column 209), RandRead I/O data transfer volume (column 210), SeqRead I/O data transfer volume (column 211), RandWrite I/O data transfer volume (column 212), SeqWrite I/O data transfer volume (column 213), and data collection time (column 214).

The VM name of column 201 is a name of the virtual machine 250 to be objected, and the AP name of column 202 is a name of the application 251 to be objected. The CPU utilization of column 203 and the memory utilization of column 204 represent utilizations, in units of "%", of CPU 22 and memory 21 allocated to the virtual machine to be objected at the time when the data is collected. The operation rate of column 205 represents a rate at which the virtual machine 250 performs the I/O operation on the device file 24 (i.e., LDEV 32) in one second.

Here "RandRead" is an abbreviation of random read and "RandWrite" is an abbreviation of random write. They represent a method of writing and reading data in discrete regions on the disk. IOPS represents the number of times that the I/O operation is performed on the disk in one second. That is, "RandRead IOPS" in column 206 means the number of I/O operations that can be done in one second when the virtual machine 250 performs a random read on the disk. "RandWrite IOPS" in column 207 represents the number of I/O operations that can be done in one second when the virtual machine 250 performs a random write on the disk.

"SeqRead" is an abbreviation of a sequential read and "SeqWrite" is an abbreviation of a sequential write. They represent a method of writing and reading data in contiguous regions on the disk. That is, "SeqRead IOPS" in column 208 represents the number of I/O operations that can be done in one second when the virtual machine 250 performs a sequential read on the disk. "SeqWrite IOPS" in column 209 represents the number of I/O operations that can be done in one second when the virtual machine 250 performs a sequential write on the disk.

RandRead IOPS (column 206), RandWrite IOPS (column 207), SeqRead IOPS (column 208) and SeqWrite IOPS (column 209) are all counted as the number of times that the I/O operation is executed.

The I/O data transfer volume means the amount of I/O data transferred in one second. That is, the RandRead I/O data transfer volume in column 210 represents the I/O data transfer volume in one second when the virtual machine 250 performs a random read on the disk. The RandWrite I/O data transfer volume in column 212 represents the I/O data transfer volume in one second when the virtual machine 250 performs the random write on the disk.

Similarly, the SeqRead I/O data transfer volume in column 211 is an I/O data transfer volume in one second when the virtual machine 250 performs a sequential read on the disk. The SeqWrite I/O data transfer volume in column 213 is an I/O data transfer volume in one second when the virtual machine 250 performs a sequential write on the disk.

RandRead I/O data transfer volume (column 210), RandWrite I/O data transfer volume (column 212), SeqRead I/O data transfer volume (column 211) and SeqWrite I/O data transfer volume (column 213) have the units of "Mbps".

Here for the sake of convenience, RandRead IOPS, RandWrite IOPS, SeqRead IOPS and SeqWrite IOPS are all referred to simply as IOPS. Likewise, RandRead I/O data transfer volume, RandWrite I/O data transfer volume, SeqRead I/O data transfer volume and SeqWrite I/O data transfer volume are referred to simply as I/O data transfer volume. Further, IOPS and I/O data transfer volume are together referred to as an I/O volume (input/output data volume).

The data collection time is a time when data to be objected is collected. The data collection time may, for example, be when data has begun to be collected or data has been completely collected.

The virtual machine performance information retrieving agent 252 in the virtual machine 250 periodically retrieves performance information, such as CPU utilization, memory utilization, IOPSs and I/O data transfer volumes for each virtual machine 250, and sends them as a set of information to the management server 1. Upon receiving the performance information of the virtual machine 250, the management program 110 of the management server 1 registers the received performance information of the virtual machine 250 with the virtual machine performance information table 200 in its respective columns 201-214, thus creating the virtual machine performance information table 200.

(Virtual Machine Specification Information Table)

FIG. 3 shows an example of the virtual machine specification information table according to this embodiment.

The virtual machine specification information table 300 stores a maximum capacity of computer resources available in each virtual machine 250 and has VM name (column 301), CPU allocation (column 302) and memory allocation (column 303).

The VM name in column 301 is similar to the data of column 201 of FIG. 2 and its explanation is omitted here. The CPU allocation in column 302 represents the maximum capacity of CPU resources that can be allocated to the virtual machine 250 to be objected and is expressed in units of "GHz". The memory allocation in column 303 represents the maximum memory capacity that can be allocated to the virtual machine 250 and is expressed in units of "GB".

The virtual machine specification information retrieving agent 261 in the hypervisor 260, when a new virtual machine 250 is set, retrieves the specification information, such as CPU allocation and memory allocation for each virtual machine 250, and sends them as a set of information to the management server 1. Upon receipt of this specification information of the virtual machine 250, the management program 110 in the management server 1 registers the received specification information of the virtual machine 250 with the virtual machine specification information table 300 in its respective columns 301-303 to create the virtual machine specification information table 300.

(Physical Server Performance Information Table)

FIG. 4 shows an example of the physical server performance information table according to this embodiment.

The physical server performance information table 400 stores performance information of each physical servers 2 and has physical server name (column 401), CPU utilization (column 402), memory utilization (column 403), operation rate (column 404), RandRead IOPS (column 405), RandWrite IOPS (column 406), SeqRead IOPS (column 407), SeqWrite IOPS (column 408), RandRead I/O data transfer volume (column 409), SeqRead I/O data transfer volume (column 410), RandWrite I/O data transfer volume (column 411), SeqWrite I/O data transfer volume (column 412), and data collection time (column 413).

The column 401 for physical server name is a column in which to store the name of the physical server 2 to be objected. The columns 402-413 represent data for a physical server in place of a virtual machine 250 in data of the columns 210-213 of FIG. 2, so their explanation is omitted.

The physical server performance information retrieving agent 262 in the physical server 2 periodically retrieves performance information, such as CPU utilization, memory utilization, IOPSs and I/O data transfer volumes, and sends them as a set of information to the management server 1. Upon receiving the performance information of the physical server 2, the management program 110 of the management server 1 registers the received performance information of the physical server 2 with the physical server performance information table 400 in its respective columns 401-413, thus creating the physical server performance information table 400.

(Physical Server Specification Information Table)

FIG. 5 shows an example of the physical server specification information table according to this embodiment.

The physical server specification information table 500 stores performance information of each physical server 2 and has physical server name (column 501), CPU capacity (column 502), memory capacity (column 503) and maximum I/O data transfer volume (column 504).

The physical server name in column 501 is similar to the data of column 401 of FIG. 4 and its explanation is omitted here. The CPU capacity of column 502 represents the performance value of the CPU mounted in the physical server 2 to be objected and is expressed in units of "GHz". The memory capacity in column 503 represents a performance value (capacity value) of memory mounted on the physical server 2 and is expressed in units of "GB". The maximum I/O data transfer volume in column 504 represents a maximum data transfer volume available in the physical server 2 to be objected and is expressed in "Mbps". The data transfer volume has already been described earlier and its explanation is omitted here.

The physical server performance information retrieving agent 262, when the physical server 2 is newly installed, retrieves specification information on the physical server 2, such as physical server name retrieved from the physical server 2, performance values of CPU and memory mounted there and maximum I/O data transfer volume, sends them as a set of information to the management server 1. The management program 110 of the management server 1 registers the received specification information with the physical server specification information table 500, thus completing the table 500.

(LDEV Performance Information Table)

FIG. 6 shows an example of the LDEV performance information table according to this embodiment.

The LDEV performance information table 600 stores performance information of each LDEV 32 and has LDEV name (column 601), operation rate (column 602) and data collection time (column 603).

The LDEV name in column 601 is a uniquely determined name for each LDEV 32. The operation rate in column 602 represents a rate at which the virtual machine 250 is performing the I/O operation on the LDEV 32 in one second and is expressed in "%". The data collection time in column 603 is a time at which the data to be objected was collected.

The storage information retrieving agent 312 in the storage device 3 sends a set of information, including LDEV name, operation rate and data collection time, all periodically retrieved from the controller 311, as performance information of the LDEV 32 to the management server 1. The LDEV 32 performance table is created by the management program 110 in the management server 1 registering the received performance information of the LDEV 32 with the LDEV performance information table 600 in its respective columns 601-603.

(LDEV Specification Information Table)

FIG. 7 shows an example of the LDEV specification information table according to this embodiment.

The LDEV specification information table 700 stores specification information of each LDEV 32 and has LDEV name (column 701), volume capacity (column 702) and AG (Array Group) name (column 703).

The LDEV name in column 701 is similar to the data in column 601 of FIG. 6 and its explanation is omitted here. The volume capacity in column 702 is a volume capacity allocated to the LDEV 32 to be objected and is expressed in "GB". The AG name in column 703 is a name of the array group 33 making up the LDEV 32 to be objected. The AG name is a unique name at least within the system.

The storage information retrieving agent 312 in the storage device 3, when the LDEV 32 is newly set, sends a set of information, including LDEV name, volume capacity of LDEV 32 and array group name making up LDEV 32, all retrieved from the controller 311, as specification information of the LDEV 32 to the management server 1. The LDEV specification information table 700 is created by the management program 110 in the management server 1 registering the received specification information of the LDEV 32 with the LDEV specification information table 700 in its respective columns 701-703.

(Array Group Performance Information Table)

FIG. 8 shows an example of the array group performance information table according to this embodiment.

The array group performance information table 800 stores performance information of each array group 33 and includes AG name (column 801), operation rate (column 802), RandRead IOPS (column 803), RandWrite IOPS (column 804), SeqRead IOPS (column 805), SeqWrite IOPS (column 806), RandRead I/O data transfer volume (column 807), SeqRead I/O data transfer volume (column 808), RandWrite I/O data transfer volume (column 809), SeqWrite I/O data transfer volume (column 810), data collection time (column 811) and volume capacity used (column 812).

The AG name in column 801 is a name of the array group 33 unique at least within the computer system A. The operation rate in column 802, expressed in "%", represents a rate at which the virtual machine 250 is performing the I/O operation on the array group 33 in one second when the data is collected.

Data of columns 803-811 in the array group 33 are similar to those of columns 206-214 in the virtual machine 250, so the explanation of the columns 803-811 is omitted here. The used volume capacity in column 812, expressed in "GB", is the amount of volume used in the array group 33 at the time when the data was collected.

The storage information retrieving agent 312 in the storage device 3 periodically retrieves from the controller 311 the AG name, operation rate, IOPS and I/O data transfer volume to each array group 33, data collection time and used volume capacity and sends them as a set of performance information of array group 33 to the management server 1. The array group performance information table 800 is created by the management program 110 in the management server 1 registering the received performance information of the array group 33 with the array group performance information table 800 in its respective columns 801-812.

(Array Group Specification Information Table)

FIG. 9 shows an example of the array group specification information table according to this embodiment.

The array group specification information table 900 stores specification information of each array group 33 and includes AG name (column 901), volume capacity (column 902), Disk Type (column 903), Tier (column 904), RAIDLevel (column 905), Storage Type (column 906), maximum RandRead IOPS (column 907), maximum RandWrite IOPS (column 908), maximum SeqRead IOPS (column 909), maximum SeqWrite IOPS (column 910), maximum RandRead I/O data transfer volume (column 911), maximum SeqRead I/O data transfer volume (column 912), maximum RandWrite I/O data transfer volume (column 913), and maximum SeqWrite I/O data transfer volume (column 914).

The AG name in column 901 is similar to the data in column 801 of FIG. 8, so its explanation is omitted. The volume capacity in column 902 represents a volume capacity in "GB" in the array group 33 to be objected. The Disk Type of column 903 represents a kind of disks making up the array group 33, "FC" in FIG. 9 indicating Fibre Channel. As Other Disk Types, "SATA (Serial. AT Attachment)" and "SSD (Solid State Drive)" are entered in the column 903.

Tier of column 904 is a column in which a tier number is entered when tiers representing the order of priority are assigned to a plurality of array groups 33 according to their performance characteristics. The entering the tier number may be done by the management program 110 providing a dedicated definition GUI (Graphical User Interface) and storing the input data in the associated column. Once the tiers are created, frequently accessed data can be located in a tier made up of fast array groups 33 and infrequently accessed data in a tier made up of slow array groups 33, allowing for appropriate data arrangement according to the frequency of use of data.

Column 905 represents a RAID level. Storage Type in column 906 indicates a kind of storage device 3.

Maximum RandRead IOPS in column 907 indicates a maximum value of RandRead IOPS in the array group 33 to be objected. Similarly, maximum RandWrite IOPS in column 908 is a maximum value of RandWrite IOPS in the array group 33 to be objected. Maximum SeqRead IOPS in column 909 is a maximum value of SeqRead IOPS in the array group 33 to be objected. Maximum SeqWrite IOPS in column 910 is a maximum value of SeqWrite IOPS in the array group 33 to be objected.

Maximum RandRead I/O data transfer volume in column 911 is a maximum value of RandRead I/O data transfer volume in the array group 33 to be objected. Similarly, maximum SeqRead I/O data transfer volume in column 912 is a maximum value of SeqRead I/O data transfer volume in the array group 33 to be objected. Maximum RandWrite I/O data transfer volume in column 913 is a maximum value of RandWrite I/O data transfer volume in the array group 33 to be objected. Maximum SeqWrite I/O data transfer volume in column 914 is a maximum value of SeqWrite I/O data transfer volume in the array group 33 to be objected. Information in column 907-914 represent allowable input/output data volume as defined in claims.

When, during the creation of the array group 33, the storage information retrieving agent 312 in the storage device 3 retrieves information, such as AG name, volume capacity, kind of disks making up the array group 33, storage tier information, RAID level and storage kind, sends these information as a set of information to the management server 1. The management program 110 in the management server 1 registers the received information with the array group specification information table 900 in its respective columns 901-906.

As for the maximum RandRead IOPS, the maximum SeqRead IOPS, the maximum RandWrite IOPS, the maximum SeqWrite IOPS, the maximum RandRead I/O data transfer volume, the maximum SeqRead I/O data transfer volume, the maximum RandWrite I/O data transfer volume and the maximum SeqWrite I/O data transfer volume, the management server 1 for example takes measurements beforehand of the performance upper limit of each array group 33 by using benchmark test tools, retrieves the result of measurements and registers them with the array group specification information table 900 in its corresponding columns 907-914. If the performance upper limits are made public as the specification information, the user may enter the upper limits through the input device 15 of the management server 1 for registration with the array group specification information table 900.

(Path Information Table)

FIG. 10 shows an example of the path information table according to this embodiment.

The path information table 1000 describes information on a physical server 2 to which a virtual machine 250 to be objected belongs, a data destination LDEV 32 and an array group 33 to which the LDEV 32 belongs. The path information table 1000 has a physical server name (column 1001), a device file name (column 1002), a VM name (column 1003) and an LDEV name (column 1004).

The physical server name in column 1001 is a name of the physical server 2 to be objected. The device file name in column 1002 is a name of the file in which the information on the LDEV 32 of this record is described. That is, it is a name of the file that the virtual machine 250 in column 1003 accesses and which represents the LDEV 32. The VM name in column 1003 is a name of the virtual machine 250, and the LDEV name in column 1004 is a name of the destination LDEV 32 to which the job data of the virtual machine 250 is transferred.

When a virtual machine 250 is newly set or a connection with the LDEV 32 is changed, the virtual machine specification information retrieving agent 261 in the physical server 2 retrieves the name of the physical server 2, the name of the LDEV 32 allocated to the virtual machine 250 and the name of the device file 24 describing the information on the LDEV 32, and then sends them as a set of information to the management server 1. The virtual machine configuration change program 114 in the management server 1 registers the received information with the path information table 1000 in its corresponding columns 1001-1004.

(Mapping Model Table)

FIG. 11 shows an example of the mapping model table according to this embodiment.

The mapping model table 1100 stores estimated performance values of individual applications 251 for each set of the physical server 2 specification and the computer resources allocated to the virtual machine 250. In the process of estimating the I/O operation volume ("estimation method 1" of FIG. 15) following the move of the physical server 2, which will be described later, this mapping model table 1100 is used.

The mapping model table 1100 includes such data as AP name (column 1101), physical server CPU capacity (column 1102), physical server memory capacity (column 1103), physical server available CPU capacity (column 1104), physical server available memory capacity (column 1105), virtual machine CPU consumption (column 1106), virtual machine memory consumption (column 1107), estimated RandRead IOPS (column 1108), estimated RandWrite IOPS (column 1109), estimated SeqRead IOPS (column 1110), estimated SeqWrite IOPS (column 1111), estimated RandRead I/O data transfer volume (column 1112), estimated SEqRead I/O data transfer volume (column 1113), estimated RandWrite I/O data transfer volume (column 1114) and estimated SeqWrite I/O data transfer volume (column 1115).

Data in each column is described as follows, along with the method of their retrieval.

Data registered with the mapping model table 1100 can be measured in advance using benchmark test tools. More specifically, the data that can be retrieved by the management server 1 during the benchmark test is performance information and specification information of the destination physical server to which a virtual machine 250 is to be moved, the virtual machine 250 to be moved and the application 251 being executed by the virtual machine 250. Based on the information retrieved, the management server 1 performs benchmark tests and writes the result of tests in the mapping model table 1100.

The management program 110 retrieves the performance value of CPU 22 and the performance value of memory 21 from the physical server performance information retrieving agent 262 in the destination physical server and then registers them with the physical server CPU capacity in column 1102 and the physical server memory capacity in column 1103. The management program 110 also retrieves the CPU utilization and memory utilization in the destination physical server from the physical server performance information retrieving agent 262 in the destination physical server and then calculates the available CPU and memory capacities from the performance values of CPU 22 and memory 21 and registers the calculated values with the physical server available CPU capacity in column 1104 and the physical server available memory capacity in column 1105.

Further, the management program 110 retrieves from the virtual machine performance information retrieving agent 252 in the destination virtual machine the CPU consumption and memory consumption obtained as a result of the benchmark test, estimated IOPS values to the hypervisor 260—the estimated RandRead IOPS, estimated SeqRead IOPS, estimated RandWrite IOPS and estimated SeqWrite IOPS—and estimated I/O data transfer volumes—the estimated RandRead I/O data transfer volume, estimated SeqRead I/O data transfer volume, estimated RandWrite I/O data transfer volume and estimated SeqWrite I/O data transfer volume—and then registers them in the corresponding columns 1106-1115.

(Processing Volume Model Table for Each Application)

FIG. 12 shows an example of the processing volume model table for each application according to this embodiment.

The processing volume model table 1200 for each application 251 stores the estimated I/O execution volume of the application 251 according to the computer resources allocated to the application 251. The estimation of the I/O operation volume ("estimation method 2" of FIG. 16) following the move of the physical server 2 described later is done by using the processing volume model table 1200 for each application 251.

The processing volume model table for each application 251 includes such data as. AP name (column 1201), virtual machine CPU consumption (column 1202), virtual machine memory consumption (column 1203), virtual machine I/O data transfer volume (column 1204), estimated RandRead IOPS (column 1205), estimated RandWrite IOPS (column 1206), estimated SeqRead IOPS (column 1207), estimated SeqWrite IOPS (column 1208), estimated RandRead I/O data transfer volume (column 1209), estimated SeqRead I/O data transfer volume (column 1210), estimated RandWrite I/O data transfer volume (column 1211) and estimated SeqWrite I/O data transfer volume (column 1212).

The data registered with the processing volume model table 1200 for each application 251 is data that has been analyzed using benchmark test tools, as with the mapping model table 1100. The data that the management server 1 retrieves during its benchmark test includes the CPU consumption and memory consumption and the I/O performance information of each application 251.

For each data in the processing volume model table of each application 251, the method of their retrieval will be described.

The management server 1 retrieves the application name, the CPU consumption and the memory consumption in each virtual machine from the virtual machine performance information retrieving agent 252 in each virtual machine. It also retrieves a virtual machine name to get IOPSs to the device file 24 of the virtual machine 250 and I/O volumes such as I/O data transfer volumes from the virtual machine specification information retrieving agent 261 in the hypervisor 260 that controls individual virtual machines 250.

Based on the I/O volumes thus obtained, the management server 1 performs the benchmark test and registers the estimated IOPS values obtained as a result of test, such as estimated RandRead IOPS, estimated RandWrite IOPS, estimated SeqRead IOPS and estimated SeqWrite IOPS, and the estimated I/O data transfer volumes, such as estimated RandRead I/O data transfer volume, estimated SeqRead I/O data transfer volume, estimated RandWrite I/O data transfer volume and estimated SeqWrite I/O data transfer volume, with the processing volume model table 1200 for each application 251 in its associated columns 1205-1212. That is, the columns 1108-1115 in the mapping model table 1100 represent estimated values of I/O volumes that are input or output by the virtual machine 250. Columns 1202-1204 represent device information on the virtual machines 250 as defined in claims and columns 1205-1212 represent estimated input/output data volume as defined in claims.

<Table Relationship>

Figure 13:
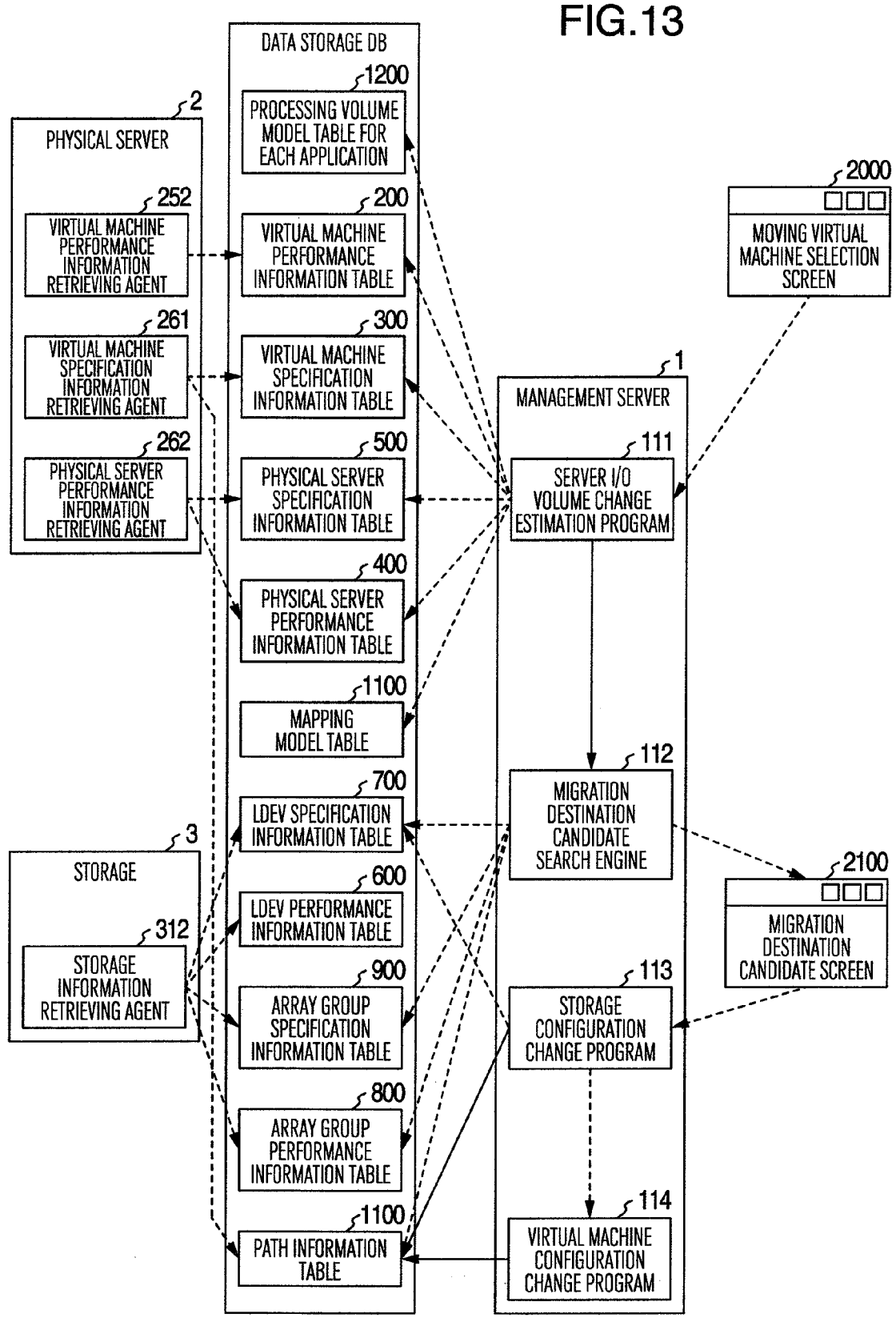
FIG. 13 is a diagram showing a relation among tables according to this embodiment.

Here, by referring to FIG. 13, the relation between tables and programs is summarized.

FIG. 13 shows a table relation according to this embodiment.

The virtual machine performance information table 200 is registered by the physical server performance information retrieving agent 262. The virtual machine specification information table 300 is registered using the data sent from the virtual machine specification information retrieving agent 261 of the physical server 2. The physical server specification information table 500 and the physical server performance information table 400 are registered by using the data sent from the physical server performance information retrieving agent 262. The LDEV specification information table 700, the LDEV performance information table 600 and the array group performance information table 800 are registered using the data sent from the storage information retrieving agent 312 of the storage device 3. The array group specification information table 900 is registered by using the benchmark test data and the data sent from the storage information retrieving agent 312 of the storage device 3.

The path information table 1000 is registered by the virtual machine configuration change program 114 using the data sent from the physical server performance information retrieving agent 262 of the physical server 2.

The processing volume model table 1200 and mapping model table 1100 for each application 251 are registered using the result of analysis produced by the benchmark test.

The server I/O volume change estimation program 111 of the management server 1, based on the information entered through the virtual machine move selection screen 2000, references the processing volume model table 1200, virtual machine performance information table 200, virtual machine specification information table 300, physical server specification information table 500, physical performance information table and mapping model table 1100 to estimate changes in I/O volume after the virtual machine has been moved.

Then, using the result produced by the server I/O volume change estimation program 111, the migration destination candidate search engine 112 references the LDEV specification information table 700, the LDEV performance information table 600, the array group specification information table 900 and the array group performance information table 800 to search migration destination candidates and display them on the migration destination candidate screen 2100.

Then, once the user specifies a migration destination on the migration destination candidate screen 2100, the storage configuration change program 113 refers to the LDEV specification information table 700 and the LDEV performance information table 600 and changes the configuration of the storage device 3 and registers the result of change with the path information table 1000.

Further, the virtual machine configuration change program 114 changes the configuration of the virtual machines 250 according to the result of change from the storage configuration change program 113 and registers the result of change with the path information table 1000.

<Flow Chart>

Next, by referring to FIG. 14 to FIG. 21 as well as FIG. 1 to FIG. 12, the process of rearranging volumes according to this embodiment will be explained.

(Overall Processing)

Figure 14:
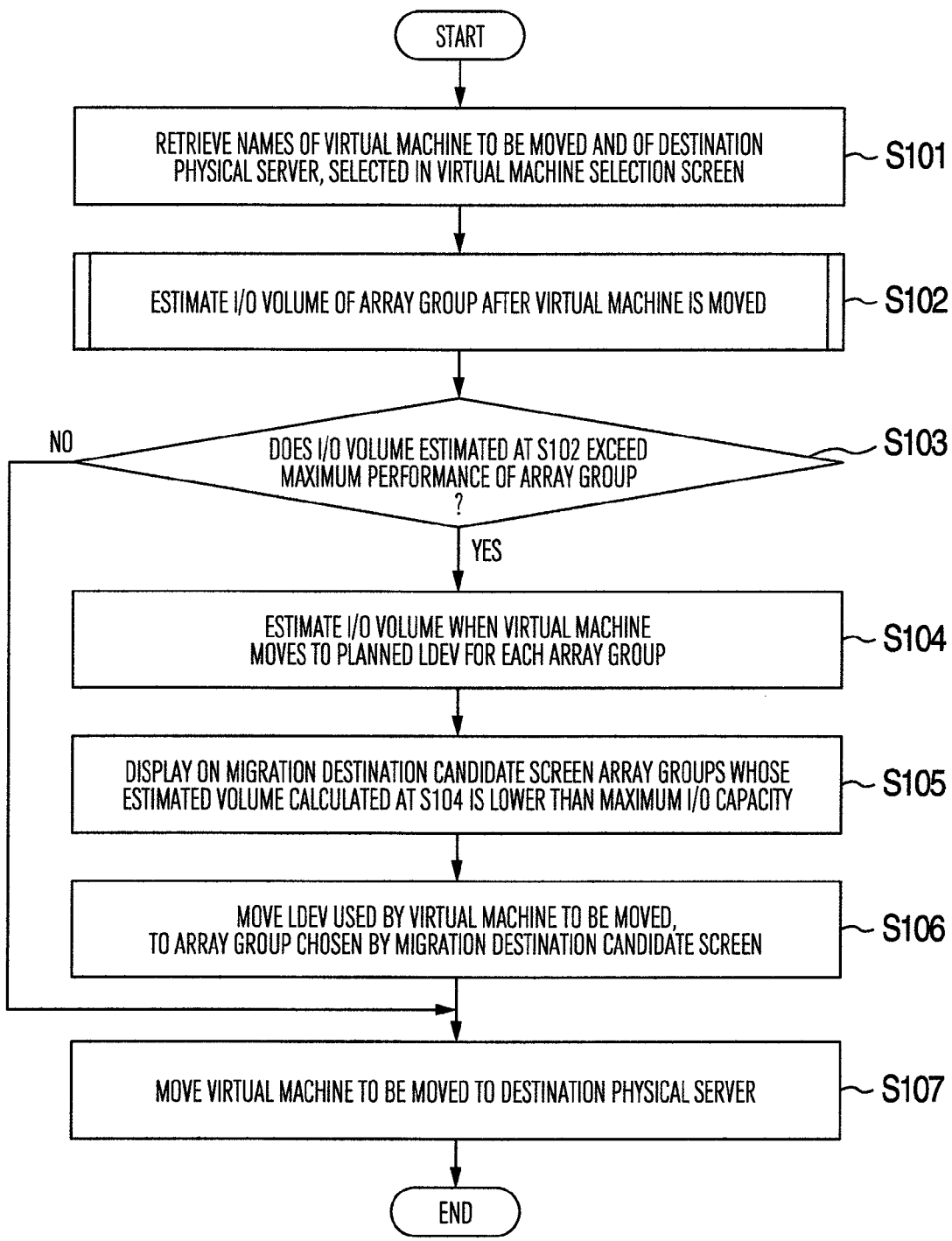
FIG. 14 is a flow chart showing a flow of an overall processing according to this embodiment.
Figure 21:
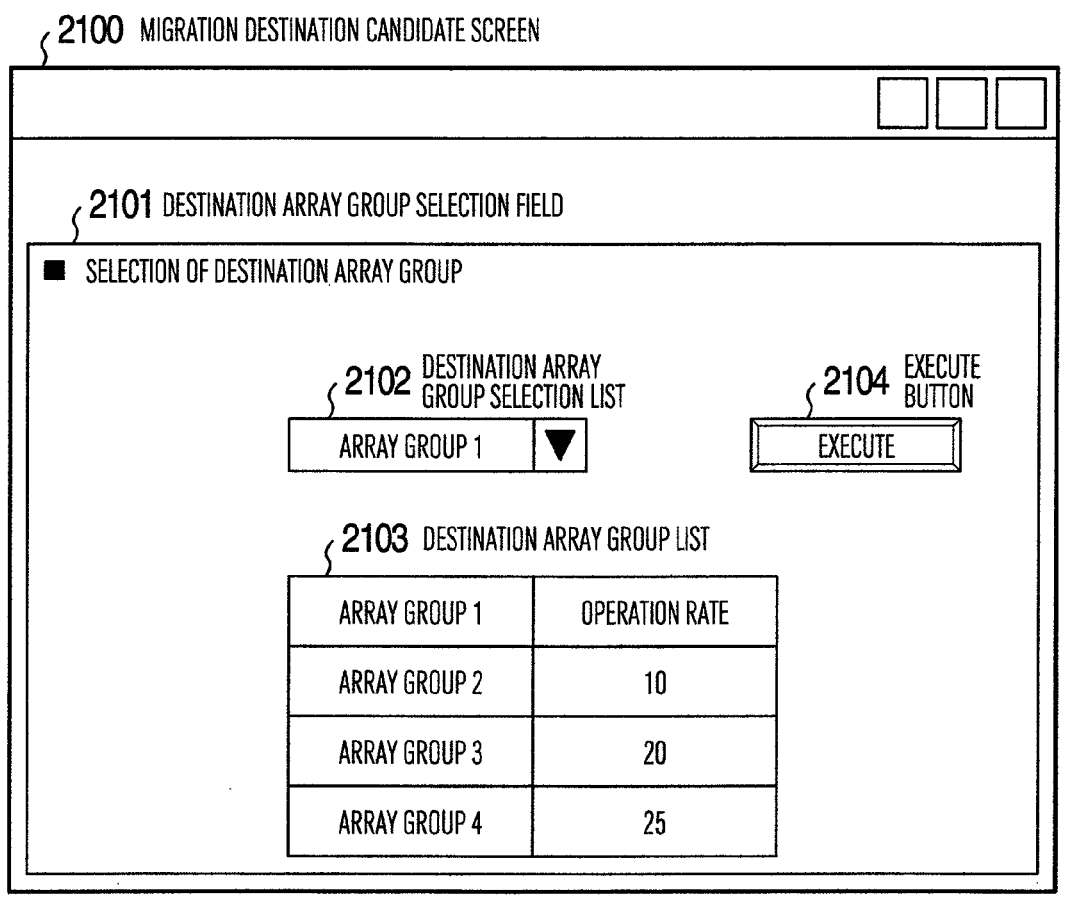
FIG. 21 shows an example screen displaying migration destination candidates.

First, by referring to FIG. 14 and FIG. 20-21, the overall processing according to this embodiment is explained.

FIG. 14 is a flow chart showing a sequence of steps for the overall processing according to this embodiment. FIG. 20 shows the virtual machine move selection screen according to this embodiment. FIG. 21 shows an example of the migration destination candidate screen.

First, the server I/O volume change estimation program 111 retrieves the name of the virtual machine that was chosen to be moved in the virtual machine move selection screen 2000 of FIG. 20 and the name of the destination physical server (S101).

More specifically, the server I/O volume change estimation program 111 displays the virtual machine move selection screen 2000 of FIG. 20 for the user to specify the virtual machine 250 to be moved and the physical server 2 for which the virtual machine 250 is destined.

(Virtual Machine Move Selection Screen)

Here, by referring to FIG. 20 the virtual machine move selection screen is explained.

The virtual machine move selection screen 2000 is a screen in which the server I/O volume change estimation program 111 causes the display device 14 to write and which accepts the names of the virtual machine to be moved and the destination physical server selected by the storage operation manager.

The virtual machine move selection screen 2000 comprises a destination physical server selection field 2001 and a virtual machine selection field 2002. The server I/O volume change estimation program 111 displays in a destination physical server selection list 2011 in the destination physical server selection field 2001 physical server names included in column 501 of the physical server specification information table 500 in the form of a pull-down menu. The server I/O volume change estimation program 111 also displays in the virtual machine selection list 2021 in the virtual machine selection field 2002 the names of virtual machines 250 included in the column 301 (VM name) of the virtual machine specification information table 300 in the form of a pull-down menu.

Then, the resource utilization situations of individual virtual machines 250 are displayed in a virtual machine list 2022 in the virtual machine selection field 2002. What is displayed in the virtual machine list 2022 includes a virtual machine name, a CPU utilization, a memory utilization and a disk volume used. These information can be retrieved from columns 201, 203-205 of the virtual machine performance information table 200.

When an execution button 2023 is pressed, the server I/O volume change estimation program 111 takes in the selected destination physical server name and the virtual machine 250 name and then the management program 110 moves to step S102 of FIG. 14.

It is also possible to expand the virtual machine move selection screen 2000 of FIG. 20 and add to the destination physical server selection field 2001 a field in which to set a CPU allocation and a memory allocation to the virtual machine to be moved that has been selected in the virtual machine selection list 2021. While in this embodiment the idle CPU and memory resources in the destination physical server are contemplated to be consumed all by the virtual machine to be moved, the addition of such a field allows the idle resources of the destination physical server to be effectively allocated.

That is, while the example of screen shown in FIG. 20 contemplates a simple model in which, to simplify the explanation, all the idle CPU and memory capacities of the destination physical server are allocated to the incoming virtual machine 250 without entering in the screen the CPU and memory capacities to be allocated to the virtual machine 250, it is possible to expand the screen to enable the setting of the CPU and memory capacities allocated to the virtual machine after being moved.

Let us return to FIG. 14.

After step S101, the server I/O volume change estimation program 111 estimates the I/O volume of the array group 33 to which a virtual machine has been moved, based on the information retrieved at step S101 (S102). More specifically, the server I/O volume change estimation program 111 takes in the name of the virtual machine to be moved and the destination physical server name obtained at step S101 and outputs estimated IOPS values and estimated I/O data transfer volumes as the estimated I/O volumes (in the case of "estimation method 3", estimated I/O data transfer volumes are output). In this embodiment, there are three methods for calculating estimated I/O volumes and details of these calculation methods will be described later referring to FIG. 15 to FIG. 18.

Next, the migration destination candidate search engine 112 checks if the I/O volume estimated at step S102 exceeds the maximum processing performance (maximum I/O capacity) of the array group 33 which the virtual machine to be moved is destined for (S103). More specifically, the migration destination candidate search engine 112 searches through the column 1004 of the path information table 1000 using the moving virtual machine name retrieved at step S101 as a key to get an LDEV name connected to the virtual machine to be moved. Next, the migration destination candidate search engine 112 searches through the column 703 (AG name) of the LDEV specification information table 700 using the retrieved LDEV name as a key to obtain an array group name. Then, the migration destination candidate search engine 112 searches through the columns 907-914 of the array group specification information table 900 using the obtained array group name as a key to get a maximum I/O capacity. It then checks if a total of the maximum I/O data transfer capacities in this maximum I/O capacity is more than a total of the estimated I/O data transfer volumes calculated at step S102 and if a total of maximum IOPS values in the maximum I/O capacity is more than a total of the estimated IOPS values calculated at step S102. If "estimation method 3" described later is used for estimation, the object to be compared in step S103 is an I/O data transfer volume.

When as a result of step S103 the maximum processing performance of the array group 33 is found not exceeded (S103→no), there is no problem in using the current array group. So, the management program 110 moves to step S107 where it moves the virtual machine 250 without executing a migration.

If the result of step S103 finds that the maximum processing performance of the array group 33 is exceeded (S103→yes), the migration destination candidate search engine 112 estimates an I/O volume for each array group 33 when the virtual machine 250 to be moved is moved to the LDEV 32 that is planned to be used (S104). More specifically, the migration destination candidate search engine 112 sums up the estimated I/O volumes calculated at step S102 and the I/O volumes of current array groups 33 in the array group performance information table 800 to estimate the I/O volumes when the LDEV 32 is moved to this array group 33. More specifically, the migration destination candidate search engine 112 retrieves the present I/O volumes from columns 803-810 of the array group performance information table 800 using the array group name retrieved by step S103 as a key. Then, the migration destination candidate search engine 112 sums up the total of the estimated I/O data transfer volumes retrieved at step S102 and the total of the estimated I/O data transfer volume in the retrieved present I/O volume. This is used as the total estimated I/O data transfer volume in the array group. Further, the migration destination candidate search engine 112 adds up the total of the estimated IOPS values retrieved at step S102 and the total of the IOPSs in the retrieved present I/O volume. This is used as a total estimated IOPS in the array group.

Then the migration destination candidate search engine 112 causes a list of array groups 33, whose estimated I/O volume calculated at step S104 is lower than the maximum I/O capacity of the array groups 33, to be displayed in the migration destination candidate screen 2100 on the display device 14 (S105). More specifically, the migration destination candidate search engine 112 calculates a total maximum IOPS, which is the total of maximum IOPS values in the maximum I/O capacity retrieved at step S103, and also a total maximum I/O data transfer volume, which is the total of the maximum I/O data transfer capacities. It then selects array groups 33 whose total estimated IOPS value is less than the total maximum IOPS and whose total estimated I/O data transfer volume is less than the total maximum I/O data transfer volume and displays a list of array groups 33 as the migration destination candidate screen on the display device 14.

(Migration Destination Candidate Screen)

Here, the migration destination candidate screen will be explained referring to FIG. 21.

The migration destination candidate screen 2100 is a screen in which the migration destination candidate search engine 112 causes the display device 14 to write and which accepts the selection of a destination array group by the storage operation manager.

The migration destination candidate screen 2100 comprises a destination array group selection field 2101. In the destination array group list 2103 in the destination array group selection field 2101 are displayed the array groups 33 selected at step S105. The destination array group list 2103 shows names of array groups 33 selected at step S105 and operation rates retrieved from the array group performance information table 800 using the array group names as a key. Then, a destination array group selection list 2102 is a pull-down menu that lets the user choose one of array groups 33 from the destination array group list 2103. When, after a destination array group is selected in the destination array group selection list 2102, an execution button 2104 is pressed, the storage change program retrieves the destination array group name and proceeds to step S106.

If applied as is to a storage environment that adopts a concept of data arrangement optimization based on a tiered management of array groups 33 in which fast disks are allocated to an application 251 that is expected to use a fast I/O volume and low disks to an application 251 that is not, there is a possibility that fast disks may be allocated to an application 251 that is not expected to have a fast I/O performance.

To avoid this problem, it is possible to expand the migration destination candidate search engine 112 so that, in selecting a migration destination of LDEV 32, the engine 112 refers to the column 904 (Tier) of the array group specification information table 900 and searches the destination array group in the tier to which the LDEV 32 to be objected belongs and, only if the associated array group 33 does not exist, moves the LDEV 32 to the array group 33 of higher tier.

More specifically, the migration destination candidate search engine 112 first retrieves from the column 703 (AG name) of the LDEV specification information table 700 the array group name to which the LDEV 32 of the virtual machine to be moved belongs and then obtains information on the tier of the retrieved array group 33 name from the column 904 (Tier) of the array group specification information table 900. The retrieval of the array group name is done in the same procedure as that explained in step S103.

When at step S105 the migration destination candidate search engine 112 selects a destination candidate array group, it refers to the column 904 (Tier) of the array group specification information table 900. If the tier corresponding to the destination candidate array group matches the tier of the array group 33 to which the LDEV 32 of the virtual machine to be moved belongs, the migration destination candidate search engine 112 adds the destination candidate array group to the list of destination array group candidates. If there are no array groups 33 having the same tier, the migration destination candidate search engine 112 performs the same processing at the next tier up.

Let us return to FIG. 14.

After step S105, the storage configuration change program 113 instructs the controller 311 in the storage device 3 to move data of the LDEV 32 that the virtual machine to be moved is using to the destination array group specified in the migration destination candidate screen 2100. Then the controller 311 in the storage device 3 moves the data of the LDEV 32 that the moving virtual machine is using to the array group 33 chosen by the migration destination candidate screen 2100 (S106). At the same time, the storage configuration change program 113 updates the associated AG name (column 703) in the LDEV specification information table 700 to the name of the destination array group by using as a key the LDEV name retrieved at step S103 which the moving virtual machine is using. The storage configuration change program 113 also updates the LDEV name (column 1004) that corresponds to the moving virtual machine in the path information table 1000.

Next, the virtual machine configuration change program 114 instructs the hypervisor 260 to move the virtual machine 250 to the physical server 2 selected at step S101. The hypervisor 260 then moves the virtual machine to be objected to the destination physical server (S107). After the virtual machine 250 has been moved by the hypervisor 260, the virtual machine configuration change program 114 updates, based on the information sent from the virtual machine specification information retrieving agent 261, the physical server name in the path information table 1000 to which the moving virtual machine belongs.

<Estimation Method>

Next, by referring to FIGS. 1-12 as well as FIGS. 15-18, three estimation methods according to this embodiment will be explained. In this embodiment these estimation methods are referred to as "estimation method 1", "estimation method 2" and "estimation method 3". Processing shown in FIGS. 15-18 corresponds to the step S102 of FIG. 14.

When it receives at step S101 of FIG. 14 the moving virtual machine name and the destination physical server name that the storage operation manager has specified, the server I/O volume change estimation program 111 in this embodiment estimates the I/O volume of the application 251 after the virtual machine 250 is moved. It then decides whether a total of the estimated I/O volume and the I/O volume of the array group 33 (currently used), which is the destination of the data of the moving virtual machine, exceeds the maximum I/O capacity of the array group 33. FIGS. 15-18 show details of the method for calculating the I/O volume (estimated I/O volume) of the application 251 after the virtual machine 250 is moved.

(Estimation Method 1)

Figure 15:
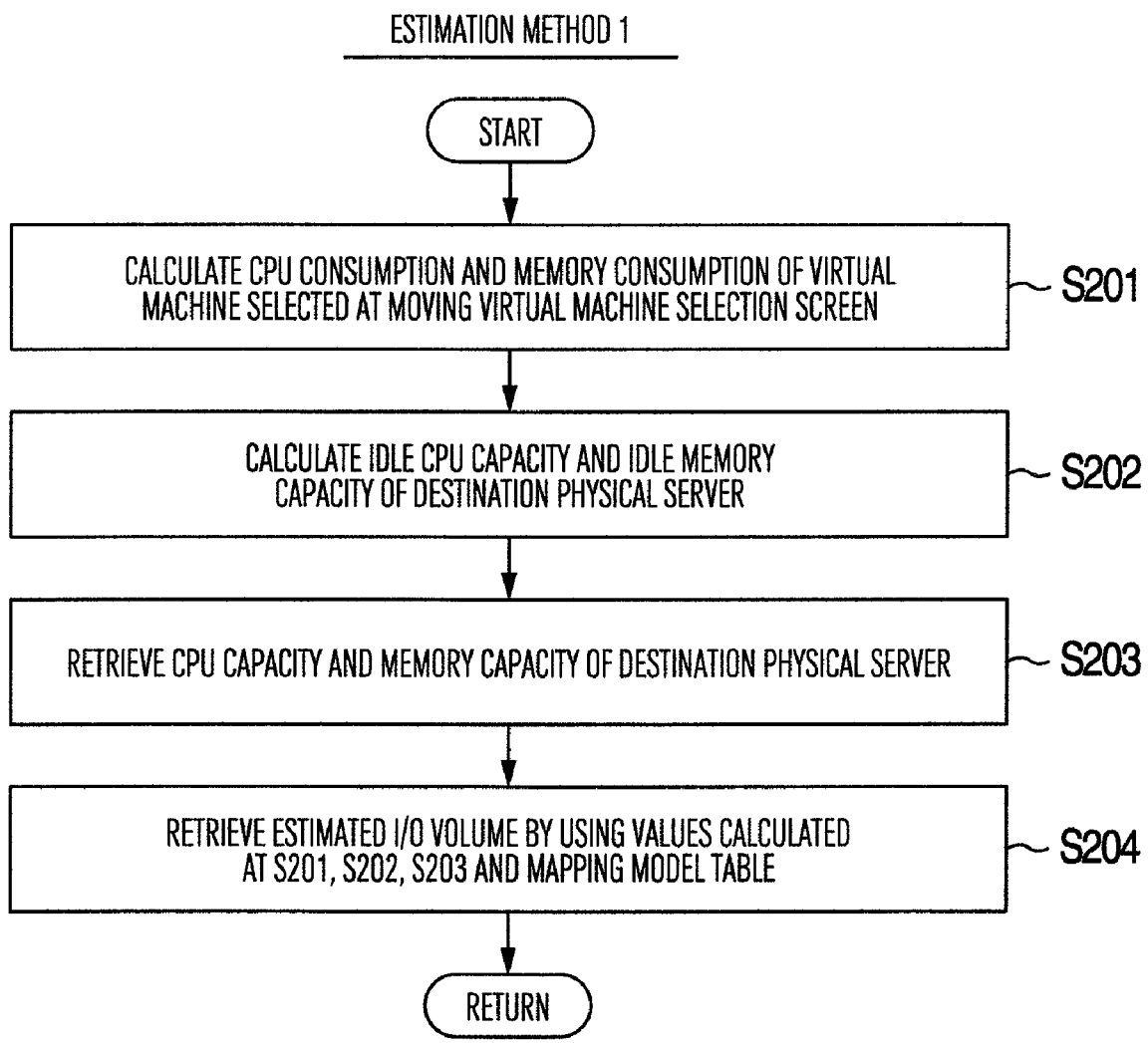
FIG. 15 is a flow chart showing a sequence of steps in an "estimation method 1" according to this embodiment.

First, the "estimation method 1" is explained by referring to FIG. 15. In the "estimation method 1", the server I/O volume change estimation program 111 calculates the estimated I/O volume using the specification information of the physical server 2 and virtual machine 250 following the relocation and a mapping model table 370.

FIG. 15 is a flow chart showing a sequence of steps executed in the "estimation method 1" of this embodiment.

First, the server I/O volume change estimation program 111 calculates a CPU consumption and a memory consumption of the virtual machine 250 selected in the virtual machine move selection screen 2000 at step S101 (step S201). More specifically, the server I/O volume change estimation program 111 retrieves the CPU allocation (column 302) and memory allocation (column 303) from the virtual machine specification information table 300 by using the moving virtual machine name obtained at step S101 as a key. Next, the program 111 retrieves the CPU utilization (column 203) and memory utilization (column 204) from the virtual machine performance information table 200 by using the moving virtual machine name obtained at step S101 as a key. Then, the estimation program 111 multiplies the retrieved CPU allocation and CPU utilization to determine a CPU consumption and also multiplies the memory allocation and memory utilization to determine a memory consumption.

Next, the server I/O volume change estimation program 111 calculates an idle CPU capacity and an idle memory capacity in the destination physical server (S202). More specifically, by using the destination physical server name obtained at step S101 of FIG. 14 as a key, the program 111 retrieves the CPU utilization (column 402) and the memory utilization (column 403) from the physical server performance information table 400 and also the CPU capacity (column 502) and the memory capacity (column 503) from the physical server specification information table 500. Then the server I/O volume change estimation program 111 executes a calculation of (1−CPU utilization)×CPU capacity and a calculation of (1−memory utilization)×memory capacity to determine the idle CPU capacity and idle memory capacity.

Next, the server I/O volume change estimation program 111 retrieves the CPU capacity (column 502) and memory capacity (column 503) of the destination physical server from the physical server specification information table 500 by using the destination physical server name obtained at step S101 as a key (step S203). It is noted that if the CPU capacity and memory capacity of the destination physical server are obtained during the step S202, the step S203 does not need to be executed.

Then, the program 111 obtains the estimated I/O volume of the virtual machine 250 after its relocation by using the values calculated and retrieved at step S201, S202 and S203 and the mapping model table 1100 (S204).

More specifically, the server I/O volume change estimation program 111 compares the CPU capacity and memory capacity of the destination physical server obtained at step S203 with the physical server CPU capacity (column 1102) and physical server memory capacity (column 1103) of the mapping model table 1100. Further, the program 111 compares the idle CPU capacity and idle memory capacity of the destination physical server calculated at step S202 with the physical server idle CPU capacity (column 1104) and physical server idle memory capacity (column 1105) of the mapping model table 1100. The program 111 then compares the CPU consumption and memory consumption of the moving virtual machine calculated at step S201 with the virtual machine CPU consumption (column 1106) and virtual machine memory consumption (column 1107) of the mapping model table 1100. The program searches through the mapping model table 1100 for a record in which these six values match and retrieves estimated I/O volumes (column 1108-1115) from this record.

Here let us explain about an example case of adding to the destination physical server selection field 2001 of FIG. 20 a new field in which to set the CPU allocation and memory allocation of the moving virtual machine selected from the virtual machine selection list 2021.

When such an expansion is made, a logic for obtaining the estimated I/O volume changes. More specifically, in referencing the mapping model table 1100, the step S204 of the "estimation method 1" uses as the input value the idle CPU capacity and idle memory capacity of the destination physical server calculated by step S202. If in the above expansion a comparison between the values calculated by step S202 and the values of the CPU allocation and memory allocation set in the virtual machine move selection screen 2000 finds that the values of the CPU allocation and memory allocation set by the virtual machine move selection screen 2000 are less than the values of the idle CPU capacity and idle memory capacity calculated by step S202, then it is possible to use the values of the CPU allocation and memory allocation set by the virtual machine move selection screen 2000, in place of the values calculated by step S202, as input values to column 1104 (physical server idle CPU capacity) and column 1105 (physical server idle memory capacity) of the mapping model table 1100.

The "estimation method 1" therefore allows for the moving of the array group 33 that considers the estimated value of I/O volume of the virtual machine 250 after its relocation, eliminating the need to perform migration that would otherwise be required if the I/O volume increases after the virtual machine 250 is moved.

(Estimation Method 2)

Next, by referring to FIG. 16 the "estimation method 2" will be explained. The "estimation method 2" calculates estimated I/O volumes of applications 251 after the virtual machine 250 is moved, by using a computer resources allocation to the relocated virtual machine 250 and the processing volume model table 1200 for each application 251.

Figure 16:
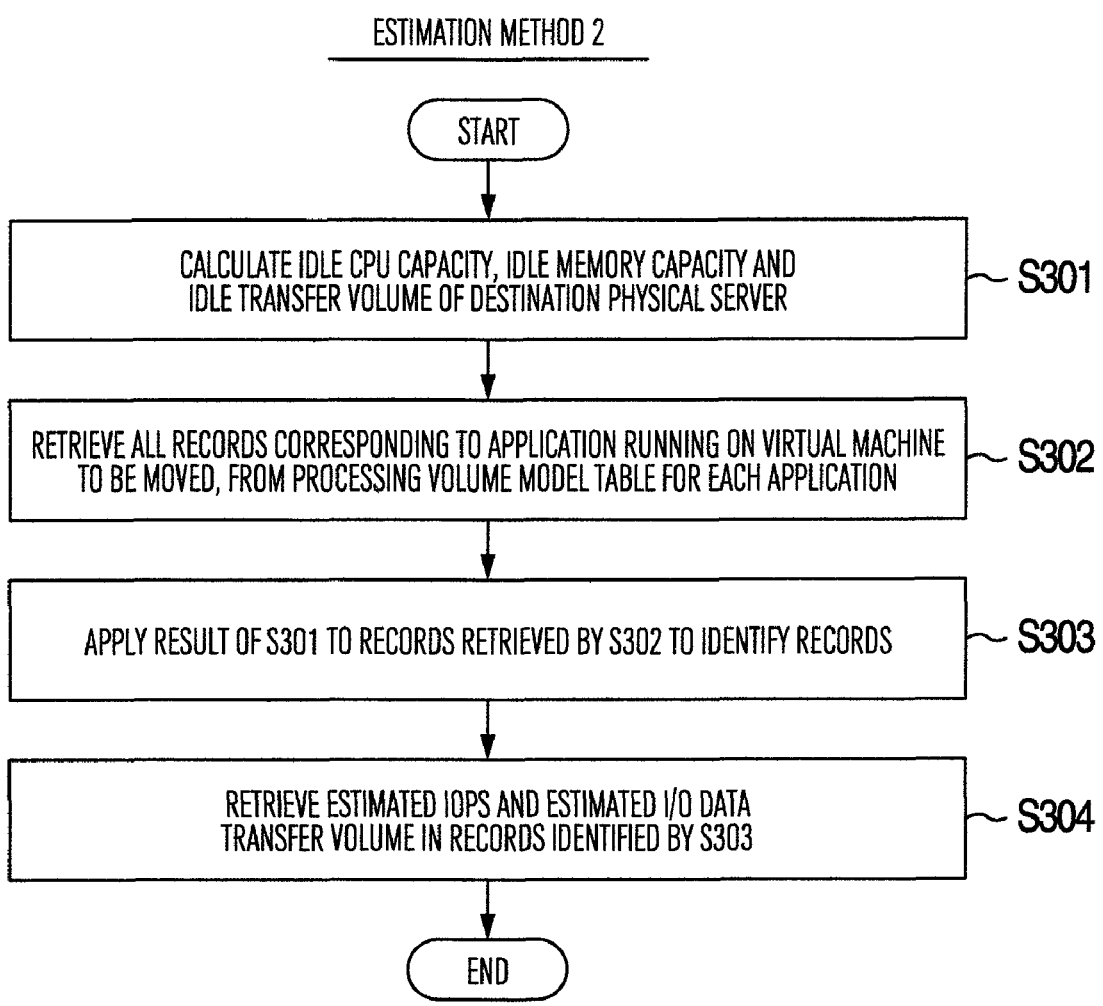
FIG. 16 is a flow chart showing a sequence of steps in an "estimation method 2" according to this embodiment.

FIG. 16 is a flow chart showing a sequence of steps executed by the "estimation method 2" according to this embodiment.

First, the server I/O volume change estimation program 111 calculates an idle CPU capacity, idle memory capacity and idle transfer volume of the destination physical server selected by step S101 (S301). More specifically, using the destination physical server name obtained at step S101 of FIG. 4 as a key, the program 111 retrieves the CPU capacity (column 502), memory capacity (column 503) and maximum I/O data transfer volume (column 504) from the physical server specification information table 500. The server I/O volume change estimation program 111 also retrieves the CPU utilization (column 402), memory utilization (column 403) and estimated I/O data transfer volumes (column 409-412) from the physical server performance information table 400. Then the server I/O volume change estimation program 111 executes a calculation of (1−CPU utilization)×CPU capacity, a calculation of (1−memory utilization)×memory capacity and a calculation of maximum I/O data transfer volume −estimated I/O data transfer volumes to determine the idle CPU capacity, idle memory capacity and idle estimated I/O data transfer volume (idle transfer volume).

Next, the server I/O volume change estimation program 111 retrieves all records corresponding to the applications 251 on the moving virtual machine from the processing volume model table 1200 for each application 251 (S302). More precisely, the server I/O volume change estimation program 111 retrieves an application name (AP name) from the column 202 of the virtual machine performance information table 200 by using as a key the moving virtual machine name obtained by step S101 of FIG. 14. Then, the program 111 retrieves, for each application 251, all records that have the application 251 name obtained as the AP name of column 1201 of the processing volume model table 1200.

Then the server I/O volume change estimation program 111 applies the result of step S301 to the records retrieved by step S302 to identify the records (S303). More specifically, from among the records retrieved by step S302, a record is identified which has the virtual machine CPU consumption (column 1202), the virtual machine memory consumption (column 1203) and virtual machine I/O data transfer volume (column 1204) that match the idle CPU capacity, the idle memory capacity and the idle transfer volume calculated by step S301.

Next, the program 111 retrieves estimated IOPS values (column 1205-1208) and estimated I/O data transfer volumes (column 1209-1212) in the record identified by step S303.

With the "estimation method 2", the I/O volume can be estimated with a smaller volume of information than required by the "estimation method 1".

(Estimation Method 3)

Next, the "estimation method 3" is explained with reference to FIGS. 17-19. The "estimation method 3" is used where the performance values of computer resources such as CPU, memory and HBA 23 on the server side reach their limit before the limit of I/O capacity of the array group 33 is reached, which can be considered to prevent the application 251 running on the virtual machine 250 from achieving the desired I/O performance. In such a situation the "estimation method 3" uses a tendency for an increase in the I/O processing volume observed before the computer resources on the server side reach their performance limit to calculate the estimated I/O volume of the application 251 after the virtual machine 250 is moved.

Figure 17:
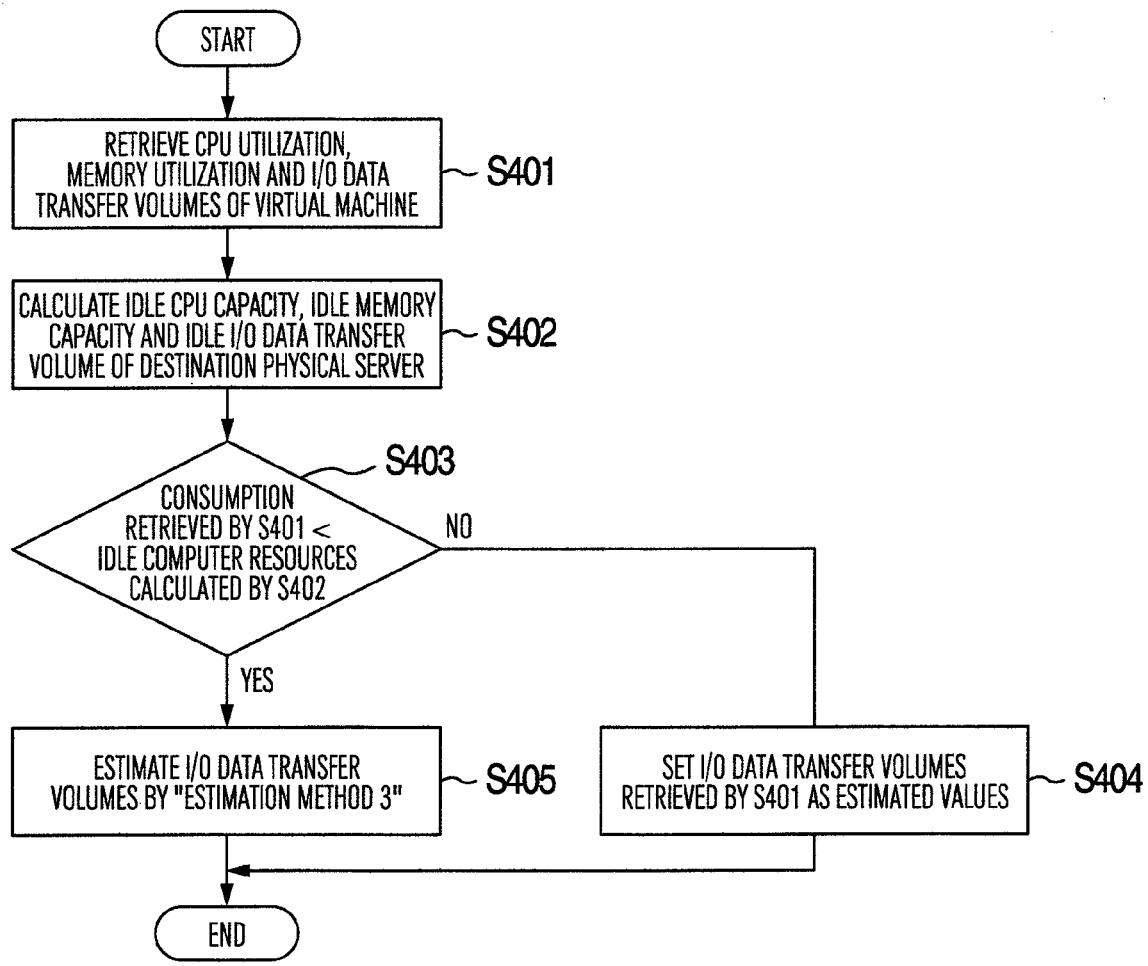
FIG. 17 is a flow chart showing a sequence of steps to decide whether or not a consumption I/O volume in a destination physical server can increase, according to this embodiment.

First, in FIG. 17, before the estimation method 3 is applied, a check is made as to whether the I/O capacity consumption in the destination physical server can increase or not (preparation for "estimation method 3"). Referring to FIG. 18, the process of calculating the estimated I/O volume according to the "estimation method 3" is explained.

FIG. 17 is a flow chart showing a sequence of steps to decide whether or not the I/O capacity consumption in the destination physical server of this embodiment can increase.

The procedure in FIG. 17 checks if the virtual machine 250 can use more computer resources than are available in the current physical server 2 by moving it to another physical server 2.

First, the server I/O volume change estimation program 111 retrieves the CPU utilization, memory utilization and estimated I/O data transfer volumes of the virtual machine 250 to be moved (S401). The information entered at this time is device information on the virtual machine 250 as defined in claims. More specifically, the server I/O volume change estimation program 111 retrieves the CPU utilization (column 203), memory utilization (column 204) and estimated I/O data transfer volumes (column 210-213) from the virtual machine performance information table 200 by using the moving virtual machine name retrieved by step S101 as a key.

Next, the program 111 calculates an idle CPU capacity, idle memory capacity and idle I/O data transfer volume of the destination physical server (S402). That is, the program 111 obtains the CPU capacity (column 502), memory capacity (column 503) and maximum I/O data transfer volume (column 504) from the physical server specification information table 500 by using the destination physical server name retrieved by step S101 as a key. Then, the program 111 retrieves the CPU utilization (column 402), memory utilization (column 403) and estimated I/O data transfer volumes (column 409-412) from the physical server performance information table 400 by using the destination physical server name obtained in FIG. 14 as a key. Then, the server I/O volume change estimation program 111 executes a calculation of (1−CPU utilization)×CPU capacity, a calculation of (1−memory utilization)×memory capacity and a calculation of maximum I/O data transfer volume−estimated I/O data transfer volumes to determine the idle CPU capacity, idle memory capacity and idle estimated I/O data transfer volume (idle transfer volume).

Next, the server I/O volume change estimation program 111 compares the consumptions of computer resources in the virtual machine 250 retrieved by step S401 with the idle computer resource capacities of the destination physical server calculated by step S402 and determines if the consumptions of computer resources retrieved by step S401 are smaller than the idle computer resource capacities calculated by step S402 (S403). That is, a check is made to see if all the following conditions are met: (CPU utilization of virtual machine 250)<(idle CPU capacity of destination physical server); (memory utilization of virtual machine 250)<(idle memory capacity of destination physical server); and (total of estimated I/O data transfer volumes of virtual machine 250) <(idle I/O data transfer volume of destination physical server).

As a result of step S403, if at least one of the above conditions is not satisfied (S403→no), the server I/O volume change estimation program 111 takes the estimated I/O data transfer volumes retrieved by step S401 as estimated values (estimated I/O data transfer volumes) (S404). Here, a situation where at least one of the above conditions is not met refers to a state in which at least one of the computer resources currently used by the virtual machine exceeds the idle computer resources of the destination physical server. So, by using this value as an estimated value from the beginning, the step S405 does not need to be executed, thus alleviating the processing burden on the server I/O volume change estimation program 111.

If as a result of step S403 all the conditions are found to be met (S403→yes), the server I/O volume change estimation program 111 calculates the estimated I/O data transfer volumes using the "estimation method 3" (S405). The processing of step S405 will be described later with reference to FIG. 18.

Figure 19A:
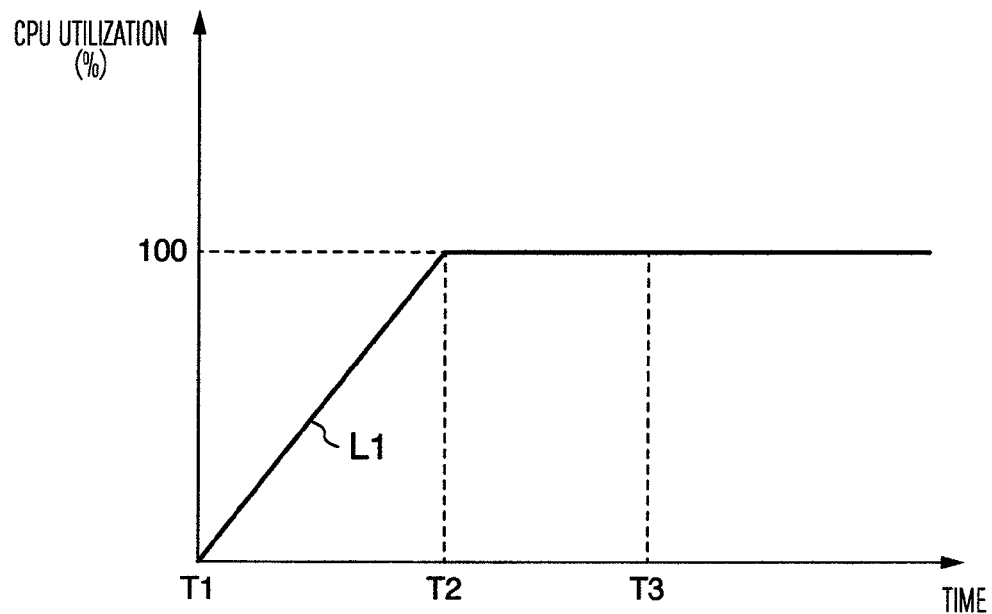
FIG. 19A is a graph schematically showing a change over time of a CPU utilization and FIG. 19B a graph schematically showing a change over time of an I/O volume.

FIG. 18 is a flow chart showing a sequence of steps to estimate the estimated I/O data transfer volumes according to the "estimation method 3" of this embodiment. FIG. 19A is a graph schematically showing a change over time of CPU utilization and FIG. 19B a graph schematically showing a change over time of I/O data transfer volume. As described above, the processing of FIG. 18 corresponds to the processing of step S405 of FIG. 17.

First, FIG. 19A is explained.

In FIG. 19A, an abscissa represents time and an ordinate a CPU utilization. Although the ordinate is shown to represent the CPU utilization, it may represent other utilizations of computer resources, such as memory utilization.

Reference number L1 represents a line showing a change in CPU utilization. In FIG. 19, the physical server 2 to be objected starts to operate at time T1 and its CPU utilization saturates at time T2. After T2, the CPU utilization remains unchanged at 100% (time T3 will be explained later).

Figure 19B:
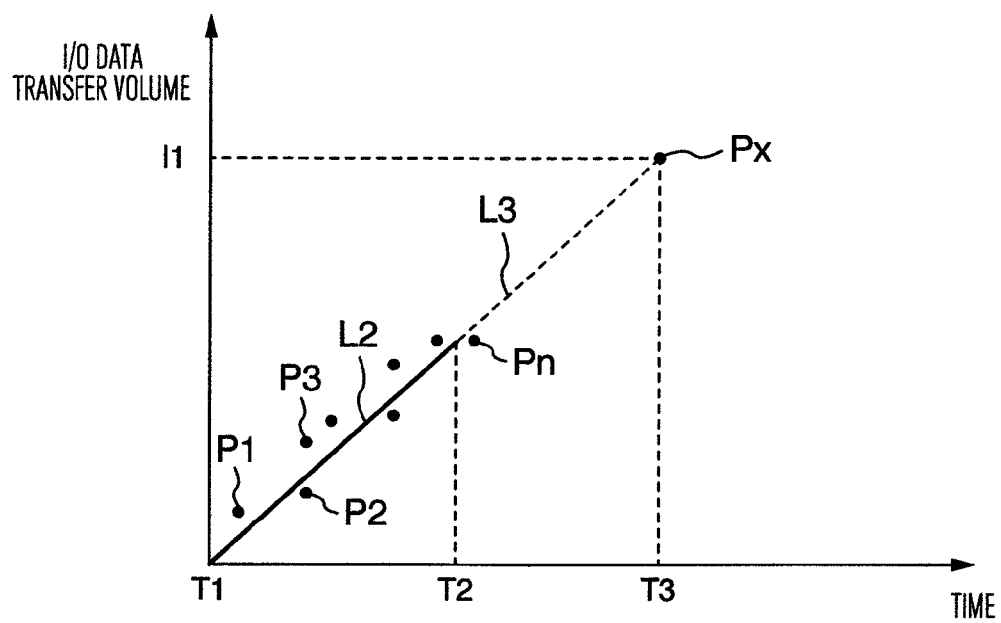

In FIG. 19B, an abscissa represents time and an ordinate represents an I/O data transfer volume. P1-Pn represents an I/O data transfer volume at each point in time. Times T1, T2 are similar to those shown in FIG. 19A and reference number I1, line L2, broken line L3 and time T3 will be described later. The I/O data transfer volume may be one of RandRead I/O data transfer volume, SeqRead I/O data transfer volume, RandWrite I/O data transfer volume and SeqWrite I/O data transfer volume, or a total of these values.

Now, FIG. 18 is explained. First, the server I/O volume change estimation program 111 retrieves data collection times when none of the utilization of computer resources of the virtual machine 250 is 100% (S501). That is, the server I/O volume change estimation program 111 retrieves data collection times (column 214) when the CPU utilization (column 203) and memory utilization (column 204) are not 100% in the virtual machine performance information table 200 by using the moving virtual machine name retrieved by step S101 of FIG. 14 as a key. Here the collection times represent immediately before the times T1-T2 of FIG. 19A.

More specifically, the server I/O volume change estimation program 111 executes the following SQL (Structured Query Language) statement for the virtual machine performance information table 200.

Select max (data collection time) FROM virtual machine performance information table 200 where CPU utilization !=100 AND memory utilization !=100 AND operation rate !=100

An SQL statement such as shown above is executed by the server I/O volume change estimation program 111 to retrieve data collection times. After this, it determines those data collection times when any one of all computer resources of the virtual machine 250 is 100% (S502). More specifically, the program 111 searches through the virtual machine performance information table 200 using the moving virtual machine name retrieved by step S101 of FIG. 14 as a key to find a data collection time (column 214) when the CPU utilization (column 203) and memory utilization (column 204) are 100% and which is immediately after the last of the data collection times retrieved by step S501. Here, the data collection time obtained represents one directly after the time T2 of FIG. 19A.

This process is done by the server I/O volume change estimation program 111 executing the following SQL statement for the virtual machine performance information table 200.

Select max (data collection time) FROM virtual machine performance information table 200 where CPU utilization=100 or memory utilization=100 or operation rate=100

The server I/O volume change estimation program 111 executes this SQL statement and retrieves data collection times. After this, the program 11 obtains all I/O data transfer volumes corresponding to the data collection times retrieved by step S501 and S502 (S503).

This corresponds to all I/O data transfer volumes from time T1 to immediately after time T2 in the ordinate of FIG. 19 (points P1-Pn in FIG. 19B).

This process is done by the server I/O volume change estimation program 111 executing the following SQL statement for the virtual machine performance information table 200.

Select * FROM virtual machine performance information table 200 where data collection times BETWEEN data collection times retrieved by step S501 AND data collection times retrieved by step S502

This SQL statement is executed by the server I/O volume change estimation program 111 to get all I/O data transfer volumes. Then, the program 111 calculates a relation equation between the data collection times retrieved by the step S501 and S502 and IOPSs, and a relation equation between the data collection times retrieved by step S501 and S502 and I/O data transfer volumes (S504).

More specifically, the program 111 performs a recursive analysis based on the data retrieved by step 802 to determine a relation equation that represents a trend for an increase in the I/O processing volume observed before the performance limit of the computer resources on the server side is reached. Here, the calculated relation equation is represented by a line L2 in FIG. 19B.

Input values for the recursive analysis may use the data collection times retrieved by step S501 and S502 and I/O data transfer volumes that occurred at the data collection times (column 210-213 in FIG. 2).

While in this embodiment the recursive analysis is used, a straight line connecting the point P1 (oldest I/O volume) in FIG. 19B and point Pn may be used as a relation equation.

Then, from the relation equation determined by step S504, the server I/O volume change estimation program 111 calculates the estimated I/O data transfer volumes (S505).

More specifically, the server I/O volume change estimation program 111 retrieves a most recent (closest to the present) data collection time from the virtual machine performance information table 200. Then the program 111 uses the most recent data collection time thus retrieved as the input value for the relation equation determined by step S504 to calculate I/O data transfer volumes at the data collection time.

Referring to FIG. 19B, the most recent data collection time is time T3. The calculated estimated I/O data transfer volumes and the estimated IOPSs are I/O data transfer volumes I1 at an intersection Px between an extension of straight line L2 (broken line L3) and a vertical line from time T3.

The server I/O volume change estimation program 111 takes the I/O data transfer volumes calculated by step S505 as the estimated I/O data transfer volumes.

The processing of step S502 may be omitted.

The "estimation method 3" can deal with a situation where the computer resources such as CPU, memory and HBA 23 on the server side reach their performance limit before the I/O processing volumes reach their limit.

Another Example of This Embodiment

In this embodiment, when a virtual machine is moved to a destination physical server, an LDEV 32 is moved based on an estimated I/O volume under the condition that all of the idle CPU capacity and idle memory capacity in the destination physical server are used. However, it is expected that after the virtual machine 250 has been moved, the actual I/O volume issued by the application 251 on the virtual machine 250 may be less than the estimated I/O volume. To deal with this problem, another example of the above embodiment may be conceived, in which after the moving virtual machine is moved, the I/O volume is periodically monitored and in which only when the maximum I/O capacity of the array group 33 is exceeded, can a data storage destination for the moving virtual machine be changed to other array group 33.

Figure 22:
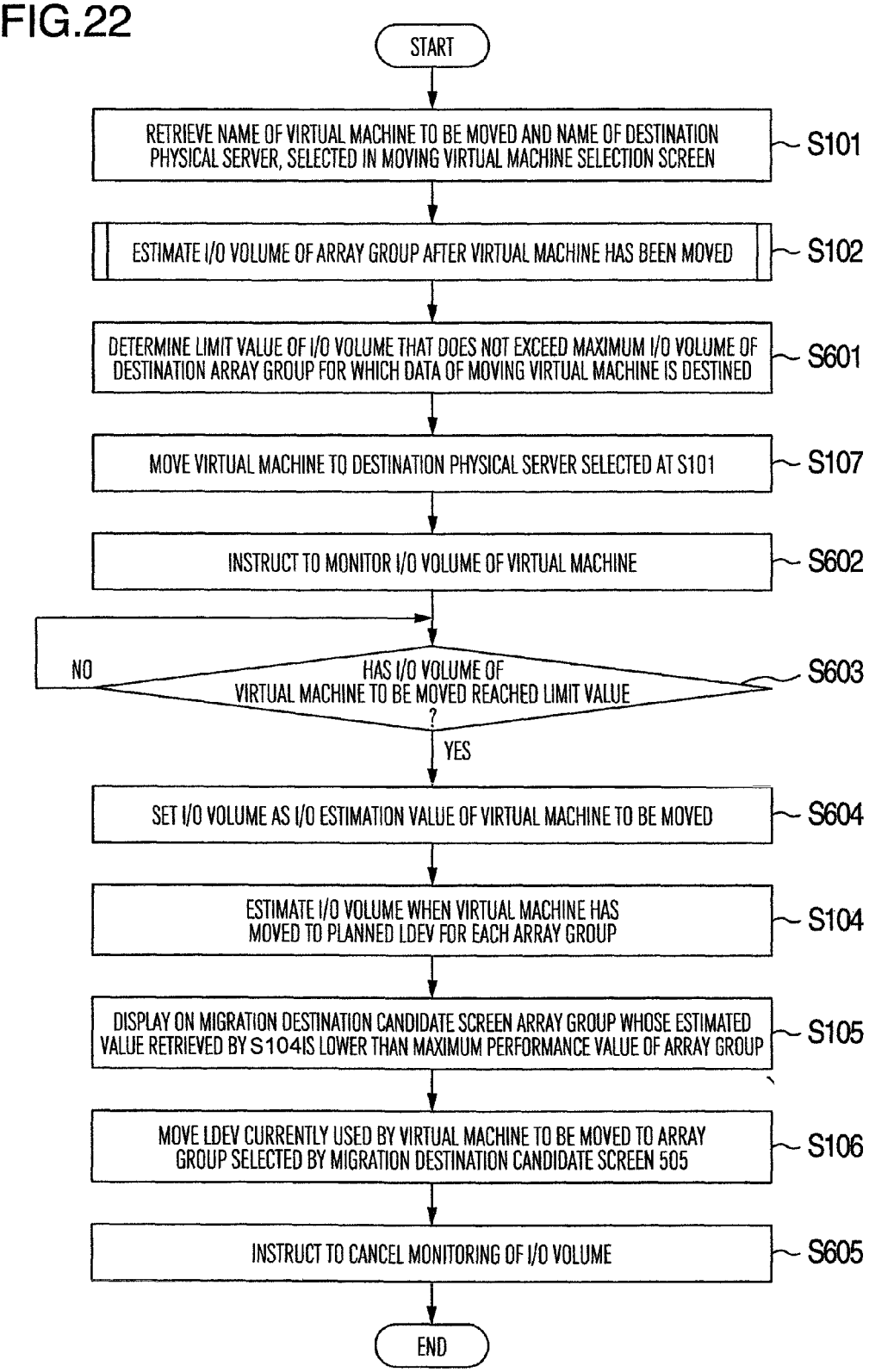
FIG. 22 is a flow chart showing a sequence of steps in another processing of this embodiment.

FIG. 22 is a flow chart showing a sequence of steps in another example of this embodiment. The configuration of the computer system A in this example is similar to that of FIG. 1 and its explanation is omitted.

An outline of FIG. 22 is explained. First, the management server 1 and the storage device 3 move the virtual machine to be objected to the destination physical server. At this time the virtual machine to be moved is allocated the idle CPU and idle memory resources of the destination physical server. Then, after the virtual machine 250 has been moved, the virtual machine configuration change program 114 sets a limit based on an estimated value and checks if the I/O volume of the virtual machine to be moved has reached this limit. Next, when the I/O volume issued by the application 251 on the moved virtual machine 250 is found to have reached this limit by the management server 1, the management server 1 and the storage device 3 move the LDEV 32, the destination data storage for the virtual machine 250, to other array group 33.

Each step of FIG. 22 will be detailed in the following. Steps similar to those of the above embodiment of FIG. 22 are given the same step numbers and their explanations are omitted.

The management server 1 executes step S101 and S102 of FIG. 14. Then the server I/O volume estimation program determines the I/O volume that can be processed by the array group 33, which is the data storage destination for the virtual machine to be moved, and also determines a limit of I/O volume not exceeding the maximum I/O capacity of the array group 33 (currently being used), the data storage destination for the virtual machine to be moved (S601). More specifically, in step S102, the server I/O volume change estimation program 111 uses one of the "estimation method 1", "estimation method 2" and "estimation method 3" to calculate an estimated I/O volume (in the case of "estimation method 3", estimated I/O data transfer volumes are calculated). Then, if the estimated I/O volume exceeds the maximum I/O capacity of the array group 33, which is the data storage destination, the server I/O volume estimation program takes as an I/O volume limit for the virtual machine to be moved the sum of the idle I/O capacity of the array group 33 and the I/O volume of the current virtual machine to be moved. If the maximum I/O capacity is not exceeded, there is no problem and the server I/O volume change estimation program 111 does not set a limit value.

Next, the virtual machine configuration change program 114 performs processing similar to step S107 of FIG. 14 and moves the virtual machine to be objected to the destination physical server selected by step S101.

Then, the virtual machine configuration change program 114 instructs the hypervisor 260 in the destination physical server to monitor the I/O volume of the virtual machine to be moved (S602). This function is provided in advance to the virtual machine configuration change program 114. In addition to this function, the virtual machine configuration change program 114 may be provided with another function to instruct a storage port side to monitor the I/O volume to detect when the I/O volume exceeds the calculated limit value. With this arrangement, the I/O volume can be monitored by both the physical server 2 and the storage device 3.

Instructed by step S602, the hypervisor 260 monitors the I/O volume of the virtual machine 250 to be moved (here the moved virtual machine) to decide whether the I/O volume of the moving virtual machine has reached the limit value determined by step S601 (step S603).

If, as a result of step S603, the limit value is found not reached (S603→no), the hypervisor 260 repeats the processing of step S603.

If the step S603 finds that the limit is reached, (S603→yes), the migration destination candidate search engine 112 sets the estimated I/O volume retrieved or calculated by step S102 as an I/O estimated value for the virtual machine to be moved (S604). Then, the migration destination candidate search engine 112, the storage configuration change program 113 and the virtual machine configuration change program 114 perform the similar processing to steps S104-S106 of FIG. 14 to execute migration. Then, the virtual machine configuration change program 114 instructs the hypervisor 260 in the destination physical server to cancel the monitoring (S605) and erase the limit value in the memory.

While the processing of FIG. 22 is performed independently of FIG. 14, it may be executed following the processing of FIG. 14.

With this embodiment, when the computer resources of the virtual machine 250 in the physical server 2 are reallocated, an increase in I/O volume as a result of the moving of the virtual machine 250 is estimated. If the estimated I/O volume exceeds the maximum I/O capacity of the array group 33 currently being used, an array group 33 with more available I/O capacity is searched. This enables the configuration change accompanied by the moving of the virtual machine 250 to be completed in only one configuration change procedure.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage management method in a computer system wherein the computer system has a virtual machine running on a physical server and a storage device and also a management server that manages a relation between the virtual machine and the physical server and a relation between the virtual machine and the storage device;
wherein the management server stores in a memory unit thereof allowable input/output information on an allowable input/output data volume of a memory device in the storage device;
wherein, when the management server moves the virtual machine from the physical server on which the virtual machine is currently mounted to another preselected physical server through an input unit, the management server:
retrieves device information about the virtual machine to be moved,
based on the retrieved device information, calculates an estimated input/output data volume, which is an estimated input/output data volume in the virtual machine to be moved,
if the calculated estimated input/output data volume is greater than an allowable input/output data volume in the memory device accessible to the virtual machine, searches for another device whose estimated input/output data volume is less than the allowable input/output data volume,
relates the searched memory device with the virtual machine to be moved,
moves the virtual machine to be moved to the other physical server, and
wherein the memory unit stores past device information and past input/output data volumes of the virtual machine to be moved;
wherein the management server:
retrieves a time when the past device information in the physical server executing the virtual machine to be moved before being moved is not in excess of a device performance limit value of the device information,
retrieves the past input/output data volumes in the retrieved time,
calculates a relation equation between the retrieved past input/output data volumes and the time,
calculates input/output data volumes in a predetermined time, based on the relation equation, and
sets the calculated input/output data volumes as the estimated input/output data volumes.

2. The storage management method according to claim 1, wherein the memory unit stores estimated input/output data volume information, the estimated input/output data volume information representing an estimated input/output data volume in the virtual machine to be moved after being moved held in a matching relation with the destination physical server and with the device information of the virtual machine to be moved;
wherein, based on the device information of the virtual machine to be moved and of the destination physical server, the management server retrieves the estimated input/output data volume information to calculate the estimated input/output data volumes corresponding to the estimated input/output data volume information.

3. The storage management method according to claim 1, wherein the memory unit stores estimated input/output data volume information, the estimated input/output data volume information representing an estimated input/output data volume in the virtual machine to be moved after being moved held in a matching relation with an application and with the device information of the virtual machine to be moved using the application;
wherein, based on the application in the virtual machine to be moved and the device information of the virtual machine to be moved, the management server retrieves the estimated input/output data volume information to calculate the estimated input/output data volumes corresponding to the estimated input/output data volume information.

4. The storage management method according to claim 1, wherein the memory device is made up of a plurality of memory devices constructed in a layered structure;
wherein the management server:
when a search is made to find a memory device whose allowable input/output data volume is less than the estimated input/output data volume, searches through the storage device in a layer to which the memory device belongs and,
if the memory device whose estimated input/output data volume is less than the allowable input/output data volume is not found in the storage device of that layer, searches through another storage device in a higher layer.

5. The storage management method according to claim 1, wherein a CPU allocation and a memory allocation to the virtual machine to be moved in the destination physical server can be set through an input/output unit.

6. The storage management method according to claim 1, wherein the management server, based on the estimated input/output data volume, sets a limit value on input/output data in the memory device used by the virtual machine to be moved,
after the virtual machine to be moved is moved by the physical server, monitors the input/output data volume of the virtual machine to be moved, and
when the input/output data volume of the virtual machine to be moved exceeds the limit value, searches for another memory device whose estimated input/output data volume is less than the allowable input/output data volume.

7. The storage management method according to claim 6, wherein the management server also monitors input/output data volume in a port of the storage device in addition to the input/output data volume of the virtual machine to be moved.

8. A management server managing a relation between a virtual machine and a physical server and a relation between the virtual machine and a storage device, the management server comprising:
a memory unit comprising a database storage device storing allowable input/output information about an allowable input/output data volume of a memory device in the storage device;

an estimated value calculation unit to, when moving the virtual machine to be moved from the physical server on which the current virtual machine is mounted to a preselected another physical server through an input unit, retrieve device information about the virtual machine to be moved and, based on the retrieved device information, calculate an estimated input/output data volume of the virtual machine to be moved after being moved;

a search unit to, when the calculated estimated input/output data volume is greater than the allowable input/output data volume in the memory device accessible to the virtual machine to be moved, search for another memory device whose estimated input/output data volume is less than the allowable input/output data volume;

a storage configuration change unit to relate the searched memory device with the virtual machine to be moved;

a virtual machine configuration change unit to move the virtual machine to be moved to another physical server, and wherein the memory unit stores past device information and past input/output data volumes of the virtual machine to be moved;

wherein the estimated value calculation unit further has functions to:

retrieve a time when the past device information in the physical server executing the virtual machine to be moved, before being moved, is not in excess of a device performance limit value of the device information, retrieve the past input/output data volumes in the retrieved time, calculate a relation equation between the retrieved past input/output data volumes and the time, calculate input/output data volumes in a predetermined time, based on the relation equation, and set the calculated input/output data volumes as the estimated input/output data volumes.

9. The management server according to claim 8, wherein the memory unit stores estimated input/output data volume information, the estimated input/output data volume information representing an estimated input/output data volume in the virtual machine to be moved after being moved, held in a matching relation with the destination physical server and with the device information of the virtual machine to be moved;

wherein the estimated value calculation unit, based on the virtual machine to be moved and the device information in the destination physical server, retrieves the corresponding estimated input/output data volume from the estimated input/output data volume information to calculate the estimated input/output data volume.

10. The management server according to claim 8, wherein the memory unit stores estimated input/output data volume information, the estimated input/output data volume information representing an estimated input/output data volume in the virtual machine to be moved, after being moved, held in a matching relation with an application and with the device information of the virtual machine to be used using the application;

wherein the estimated value calculation unit, based on an application in the virtual machine to be moved and the device information of the virtual machine to be moved, retrieves the corresponding estimated input/output data volume from the estimated input/output data volume information to calculate the estimated input/output data volume.

11. The management server according to claim 8, wherein the memory device is made up of a plurality of memory devices constructed in a layered structure;

wherein the search unit further has functions to:

when a search is made to find a memory device whose estimated input/output data volume is less than the allowable input/output data volume, search through the storage device in a layer to which the memory device belongs and, if the memory device whose estimated input/output data volume is less than the allowable input/output data volume is not found in the storage device of that layer, search through another storage device in a higher layer.

12. The management server according to claim 8, wherein a CPU allocation and a memory allocation to the virtual machine to be moved in the destination physical server can be set through an input/output unit.

13. The management server according to claim 8, wherein the estimated value calculation unit, based on the estimated input/output data volume, further has a function to set a limit value on input/output data in the memory device used by the virtual machine to be moved;

wherein the search unit further has a function to, after the virtual machine to be moved is moved by the physical server, monitor the input/output data volume of the virtual machine to be moved and, when the input/output data volume of the virtual machine to be moved exceeds the limit value, search for a memory device whose allowable input/output data volume is less than the estimated input/output data volume.

* * * * *